United States Patent
Yoshida et al.

(10) Patent No.: US 8,107,142 B2
(45) Date of Patent: Jan. 31, 2012

(54) IMAGE PROCESSING APPARATUS, IMAGE PROCESSING METHOD, AND PROGRAM PRODUCT FOR EXECUTING THE METHOD

(75) Inventors: Tomoyuki Yoshida, Tokyo (JP); Hiroyuki Kawamoto, Kanagawa (JP); Satoshi Ohkawa, Tokyo (JP); Atsushi Togami, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1182 days.

(21) Appl. No.: 11/899,242

(22) Filed: Sep. 5, 2007

(65) Prior Publication Data

US 2008/0068671 A1    Mar. 20, 2008

(30) Foreign Application Priority Data

Sep. 5, 2006 (JP) .................................. 2006-240750

(51) Int. Cl.
*H04N 1/46* (2006.01)

(52) U.S. Cl. ....... 358/540; 358/1.15; 358/444; 358/450; 358/451; 358/1.13

(58) Field of Classification Search .................. 358/540, 358/444, 450, 451, 1.15, 1.13
See application file for complete search history.

(56) References Cited

U.S. PATENT DOCUMENTS 5,465,163 A * 11/1995 Yoshihara et al. ............. 358/444
2007/0279667 A1 * 12/2007 Hattori et al. ................. 358/1.13

FOREIGN PATENT DOCUMENTS

| JP | 2001-251522 | 9/2001 |
|----|-------------|--------|
| JP | 2001-358929 | 12/2001 |
| JP | 3647347 | 2/2005 |
| JP | 2006-303678 | 11/2006 |

OTHER PUBLICATIONS

Dec. 14, 2010 Japanese official action in connection with a counterpart Japanese patent application.

* cited by examiner

*Primary Examiner* — Twyler Haskins
*Assistant Examiner* — Michael Burleson
(74) *Attorney, Agent, or Firm* — Cooper & Dunham LLP

(57) ABSTRACT

An image processing apparatus is disclosed. The image processing apparatus stores image data read by a document reading section and image data received from an external device. An image data synthesizing unit synthesizes first image data read by the document reading section and second image data read by the document reading section or received from the external device. An image correcting unit generates image distinctive data of the first and second image data. A synthesized image distinctive data generating unit synthesizes the image distinctive data of the first and second image data by referring to an LUT (lookup table) selected by a synthesized image distinctive generating rule selecting unit. A predetermined process is applied the synthesized image data based on the synthesized image distinctive data.

17 Claims, 27 Drawing Sheets

FIG.3

| BIT | VALUE | DEFINITION |
|---|---|---|
| b1 | 1 | LETTER |
| | 0 | NON-LETTER |
| b0 | 1 | CHROMATIC |
| | 0 | ACHROMATIC |

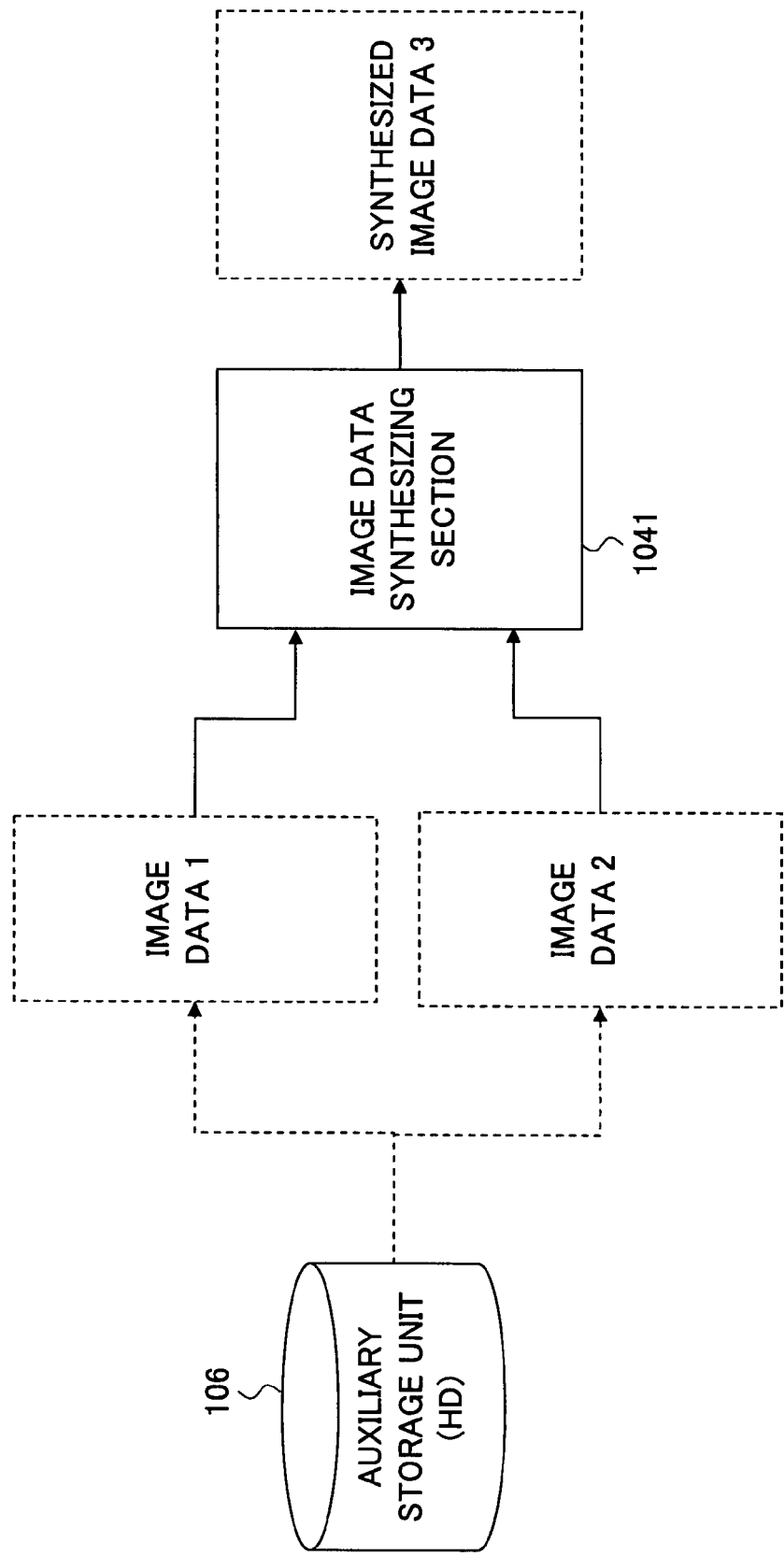

FIG.9
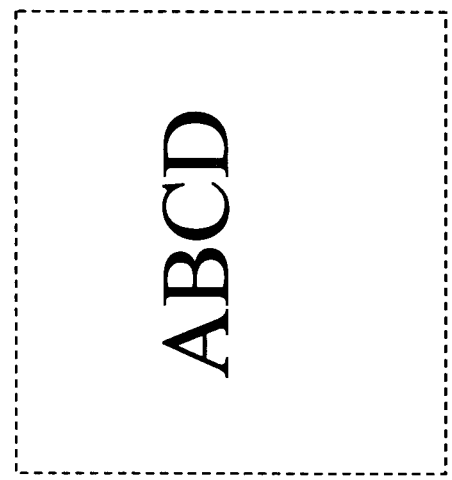
SYNTHESIZED IMAGE DATA 3
=
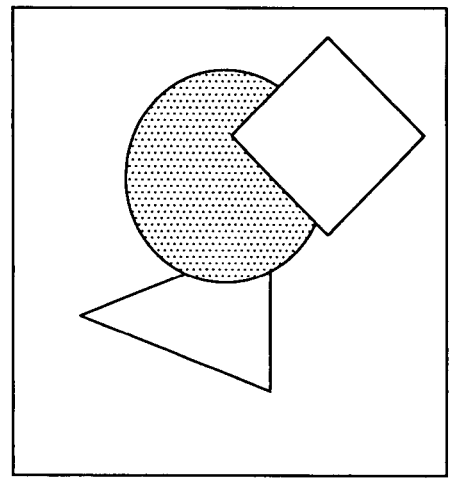
IMAGE DATA 2
+
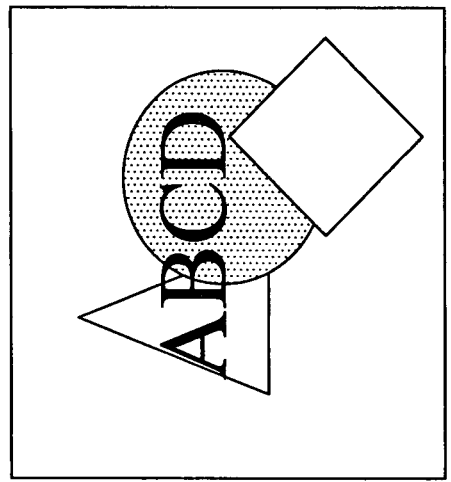
IMAGE DATA 1

FIG.10

| COMBINATION | | IMAGE DISTINCTIVE DATA 2 | | | |
|---|---|---|---|---|---|
| | | 11 | 10 | 01 | 00 |
| IMAGE DISTINCTIVE DATA 1 | 11 | 11 | 10 | 01 | 00 |
| | 10 | 11 | 11 | 01 | 00 |
| | 01 | 01 | 10 | 01 | 00 |
| | 00 | 00 | 01 | 01 | 00 |

| BIT | VALUE | DEFINITION |
|---|---|---|
| b1 | 1 | NON-IMAGE |
| | 0 | IMAGE |
| b0 | 1 | NON-WHITE BACKGROUND |
| | 0 | WHITE BACKGROUND |

FIG.17

| COMBINATION | | IMAGE DISTINCTIVE DATA 2 | | | |
|---|---|---|---|---|---|
| | | 11 | 10 | 01 | 00 |
| IMAGE DISTINCTIVE DATA 1 | 11 | 11 | 11 | 01 | 11 |
| | 10 | 11 | 10 | 01 | 00 |
| | 01 | 01 | 10 | 01 | 00 |
| | 00 | 00 | 00 | 01 | 00 |

| IMAGE DISTINCTIVE DATA 1 / COMBINATION | IMAGE DISTINCTIVE DATA 2 | | | |
|---|---|---|---|---|
| 11 | 11 | 10 | 01 | 00 |
| 10 | 01 | 11 | 01 | 00 |
| 01 | 11 | 10 | 01 | 00 |
| 00 | 01 | 01 | 01 | 01 |
|  | 00 | 00 | 00 | 00 |

| COMBINATION | IMAGE DISTINCTIVE DATA 2 | | | |
|---|---|---|---|---|
| | 11 | 10 | 01 | 00 |
| IMAGE DISTINCTIVE DATA 1 — 11 | 01 | 01 | 01 | 01 |
| 10 | 01 | 01 | 01 | 01 |
| 01 | 01 | 01 | 01 | 01 |
| 00 | 01 | 01 | 01 | 01 |

| COMBINATION | | IMAGE DISTINCTIVE DATA 2 | | | |
|---|---|---|---|---|---|
| | | 11 | 10 | 01 | 00 |
| IMAGE DISTINCTIVE DATA 1 | 11 | 10 | 10 | 10 | 10 |
| | 10 | 10 | 10 | 10 | 10 |
| | 01 | 10 | 10 | 10 | 10 |
| | 00 | 10 | 10 | 10 | 10 | ized, and digital technologies such as a compression
IMAGE PROCESSING APPARATUS, IMAGE PROCESSING METHOD, AND PROGRAM PRODUCT FOR EXECUTING THE METHOD

BACKGROUND

1. Technical Field

This disclosure generally relates to an image processing apparatus, an image processing method, and a program product for executing the method in which an image synthesizing function is provided.

2. Description of the Related Art

By development of an image reading device which uses a line sensor formed of a CCD (charge coupled device) (photoelectric conversion element), and a toner image writing device which irradiates laser beams on a photoconductor body, digital copiers have been made available in the market place in which a document is copied by converting analog image data into digital image data.

Since the digital image data are used, not only the digital copiers, but MFPs (multifunctional peripherals) have been made available in the market place in which various functions such as a copying function, a facsimile function, a printing function, and an image scanning function are integrated.

Recently, the throughput of CPUs (central processing units) has been increasing, the capacity of storage units such as HDDs (hard disk drives) has been increasing, the manufacturing cost of storage units has been decreasing, high-speed operations in communication networks have been realized, and digital technologies such as a compression technology for digital image data have been developed. With these developments, many functions have been installed in the MFPs.

In addition, corresponding to changes of the office environment where the MFPs are used, various types of MFPs have been developed to meet the demands for use of the MFPs.

For example, a small-type MFP is used with a PC (personal computer) in an office so that a user can easily use functions such as a copying function, a facsimile function, a printing function, and an image scanning function; a middle-type MFP is used in common by plural persons in an office so that productivity in the office is increased by using functions such as a document sorting function, a document punching function, and a document stapling function with the above described functions; and a large-type MFP is used in a department so that jobs related to document copying are centralized or in a company whose business is copying documents so that the multiple functions are performed with high productivity in forming high quality images.

In order to satisfy the demands in the market place, in each of the MFPs, a system having necessary functions has been developed, and an MFP having the developed system has been offered to users.

The importance of information has been long recognized in business. In an apparatus including an MFP which processes information, the apparatus has been required to have functions to provide the information effectively and clearly in addition to providing the information accurately and quickly.

In an apparatus which handles information, the apparatus has been required to have a new function which effectively and clearly handles information by using digital data. Even in the MFP market place, a new type MFP has been required in which information can be effectively and clearly processed by utilizing digital data.

As one of the functions, image data of a document read by a reading function of an MFP is stored in a storage unit, and when a user requests the image data, the image data are output.

When the image data stored in the storage unit are output, in many cases, time has passed from storing the image data to outputting the image data, and a request of the user for outputting the image data may be changed.

In Patent Document 1, an image processing apparatus is disclosed. In the image processing apparatus, a distinctive part of a document is extracted, processes such as a filtering process and a color correcting process are applied to image data of the document based on an extracted result, and the image data of the document and an identification signal showing the distinctive part of the image data are stored in an HDD. When a user requests to output the image data, an image process corresponding to the request of the user is executed based on the requirement of the user.

[Patent Document 1] Japanese Patent No. 3647347 (Japanese Laid-Open Patent Application No. 2001-223828)

However, in Patent Document 1, the stored image data depend on an input characteristic of an image reading device of the image processing apparatus. When the image data are shared with other apparatuses, the input characteristic of the image reading device must be transmitted to the other apparatuses, with the image data which the apparatus desires to share, as a profile. Consequently, the processes becomes complex.

In addition, in Patent Document 1, in a case where an irreversible data compression technology (for example, a technology in JPEG (Joint Photographic Experts Group) is used for storing the image data, when the document is formed of halftone dots, the compression rate is lowered, and an unintended moire pattern is generated. Consequently, in some cases, image quality may be extremely degraded.

In addition, in a case where the compression rate is lowered by noise and there are remaining white background data when the document is read, and in a case where the compression rate is lowered when the document is formed of the halftone dots, the processing speed for the image data is lowered and a large region for storing the image data is required.

There is a method which solves the above problems. In the method, an image region separating process is applied to image data before the image data are stored, from separated image regions, only image regions having image distinctive data, which are necessary when an image process is applied to the image data, are converted into predetermined signals, and from the converted signals, image distinctive data are generated. Then a most suitable image process is applied to the image data based on the image distinctive data.

In the above method, degradation of image quality is prevented and using the large region for storing the image data is avoided. However, when the image data input from the image reading device in the MFP and image data input from an external apparatus (for example, an information processing apparatus, an external recording medium, or an external image processing apparatus) are stored in a storage unit and the stored image data are output by synthesizing the stored image data, since suitable synthesized image distinctive data are not generated for the synthesized image data, a suitable image process cannot be applied to the synthesized image data. Consequently, unintended image data may be output.

BRIEF SUMMARY

In an aspect of this disclosure, there is provided an image processing apparatus, an image processing method, and a program product for executing the method in which synthesized image distinctive data are efficiently generated and most suitable synthesized image data are formed by using the generated synthesized image distinctive data.

In another aspect, there is provided an image processing apparatus that includes a document reading unit which reads image data of a document, an image distinctive data generating unit which generates image distinctive data of the image data read by the document reading unit, an image data receiving unit which receives image data input from an external device, an image data storing unit which stores the image data read by the document reading section, the image distinctive data generated by the image distinctive data generating unit, and the image data received from the external device, an image data synthesizing unit which synthesizes first image data and second image data stored in the image data storing section, and synthesizes first image distinctive data of the first image data and second image distinctive data of the second image data, and an image data processing unit which applies a predetermined process to the synthesized image data of the first image data and the second image data based on synthesized image distinctive data of the first and second image distinctive data.

According to another aspect, there is provided an image processing method, in an image processing apparatus, including the steps of reading image data of a document, generating image distinctive data of the read image data, receiving image data input from an external device, storing the read image data, the generated image distinctive data, and the image data received from the external device; synthesizing stored first image data and second image data, and synthesizing first image distinctive data of the first image data and second image distinctive data of the second image data; and applying a predetermined process to the synthesized image data of the first image data and the second image data based on synthesized image distinctive data of the first and second image distinctive data.

According to another aspect, there is provided a program product for executing an image processing method in an image processing apparatus, the image processing method including the steps of reading image data of a document, generating image distinctive data of the read image data, receiving image data input from an external device, storing the read image data, the generated image distinctive data, and the image data received from the external device; synthesizing stored first image data and second image data, and synthesizing first image distinctive data of the first image data and second image distinctive data of the second image data; and applying a predetermined process to the synthesized image data of the first image data and the second image data based on synthesized image distinctive data of the first and second image distinctive data.

According to an embodiment of this disclosure, first image data and second image data stored in an image processing apparatus are synthesized, and an adaptive process for increasing reproducibility of synthesized image data of the first image data and the second image data is applied to the synthesized image data based on synthesized image distinctive data of image distinctive data of the first and second image data. Therefore, an optimum synthesized image data can be obtained.

BRIEF DESCRIPTION OF THE DRAWINGS

The aforementioned and other aspects, features and advantages will become more apparent from the following detailed description when read in conjunction with the accompanying drawings, in which:

FIG. 3 is a table showing a bit definition of image distinctive data which are used in the image processing apparatus shown in FIG. 1;

FIG. 7A is a diagram showing operations of an image data synthesizing section in a stored data synthesizing section shown in FIG. 1;

FIG. 9 is a diagram showing an example of synthesized image data synthesized by an image data synthesizing unit shown FIG. 8;

FIG. 10 is a first LUT (lookup table) in the image processing apparatus;

FIG. 16 is a table showing a bit definition of the image distinctive data which are used for image data input via the external device I/F;

FIG. 17 is a second LUT 41 in the image processing apparatus;

FIG. 19 is a third LUT in the image processing apparatus 100;

FIG. 21 is a fourth LUT in the image processing apparatus;

FIG. 23 is a fifth LUT in the image processing apparatus;

DESCRIPTION OF THE PREFERRED EMBODIMENTS

Best Mode of Carrying Out the Invention

The best mode of carrying out the present invention is described with reference to the accompanying drawings.

First Embodiment

Figure 1:
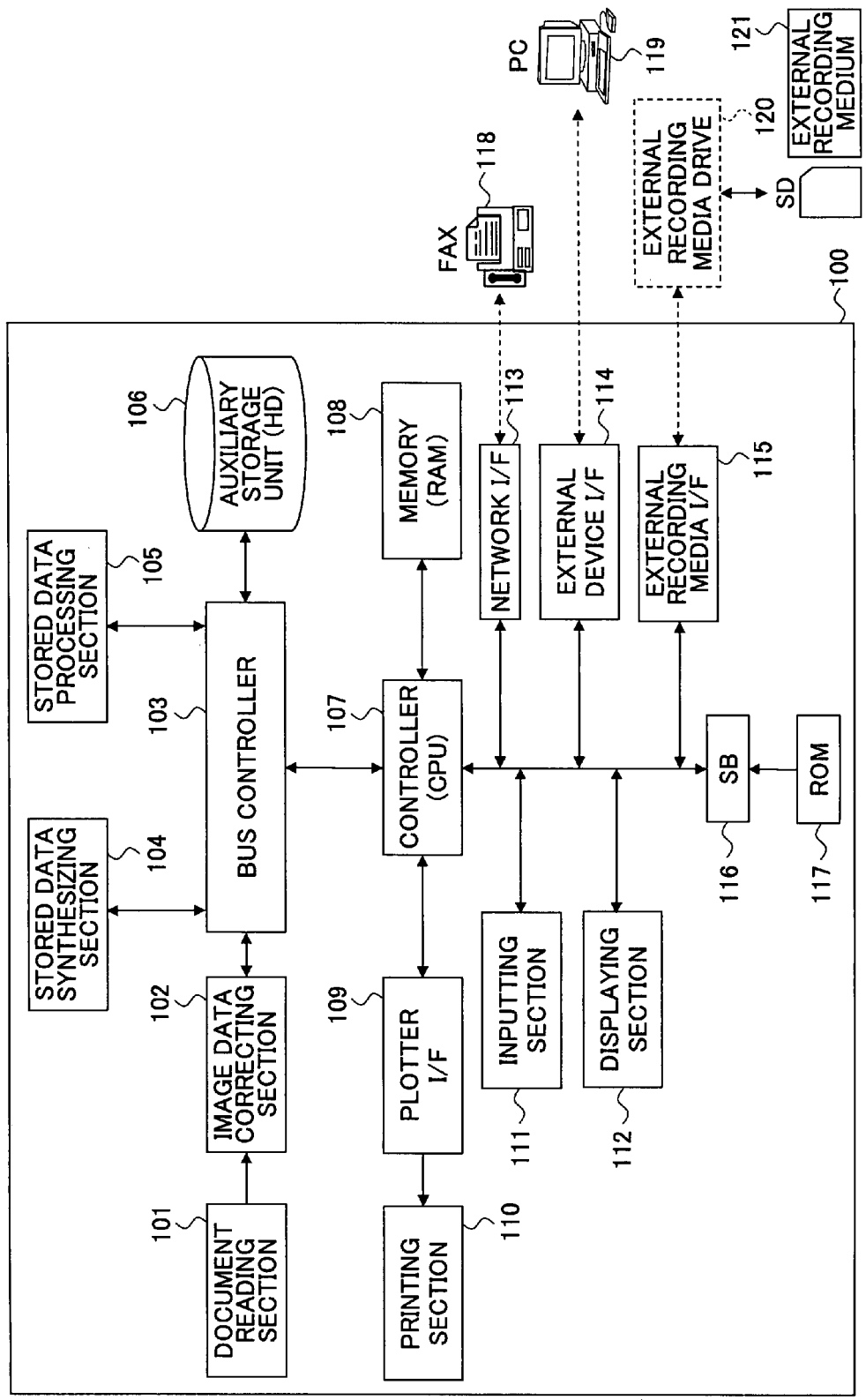
FIG. 1 is a block diagram showing an image processing apparatus according to a first embodiment of the present invention.

FIG. 1 is a block diagram showing an image processing apparatus 100 according to a first embodiment of the present invention.

As shown in FIG. 1, the image processing apparatus 100 includes a document reading section 101, an image data correcting section 102, a bus controller 103, a stored data synthesizing section 104, a stored data processing section 105, an auxiliary storage unit 106 (HD), a controller 107 (CPU), a memory 108 (RAM), a plotter I/F 109, a printing section 110 (plotter), an inputting section 111 (operating section), a displaying section 112 (display), a network I/F 113, an external device I/F 114, an external recording media I/F 115, an SB (south bridge) 116, and a ROM 117.

The document reading section 101 includes a CCD (line sensor), an ADC (analog to digital converter), and a driving circuit for driving the CCD and the ADC. The document reading section 101 reads (scans) a document put on a document reading surface (contact glass) of the document reading section 101, and generates digital image data (RGB data of 8 bits per pixel) (hereinafter referred to as image data) from density information of the read document and outputs the image data.

The image data correcting section 102 is formed of an ASIC (application specific integrated circuit). The image data correcting section 102 applies an image correcting process, an image region separating process, and a region converting process to the image data read (scanned) by the document reading section 101 so that the image data are standardized to have predetermined characteristics, and outputs the corrected image data and image distinctive data expressing the distinctiveness of the image data. The detailed processes in the image data correcting section 102 are described below by referring to FIG. 2.

The bus controller 103 is formed of an ASIC and controls data buses in the image processing apparatus 100. The bus controller 103 has a bridge function among plural kinds of bus standards. Various data such as the image data, the image distinctive data, and controlling commands are transmitted among elements in the image forming apparatus 100 via the corresponding data buses. In the present embodiment, the image data correcting section 102, the stored data synthesizing section 104, and the stored data processing section 105 are connected to the bus controller 103 via corresponding PCI Express buses, and the auxiliary storage unit 106 is connected to the bus controller 103 via an ATA (AT attachment) bus.

The stored data synthesizing section 104 is formed of an ASIC and synthesizes image data stored in the auxiliary storage unit 106 and image distinctive data stored in the auxiliary storage unit 106. The image data and the image distinctive data output from the image data correcting section 102 are stored in the auxiliary storage unit 106 via the bus controller 103.

In addition, the image data input from the network I/F 113, the external device I/F 114, and the external recording media I/F 115 are stored in the auxiliary storage unit 106 via the controller 107 and the bus controller 103. That is, the stored data synthesizing section 104 generates synthesized image data by synthesizing the image data stored in the auxiliary storage unit 106 and generates synthesized image distinctive data expressing the distinctiveness the synthesized image data by synthesizing the image distinctive data stored in the auxiliary storage unit 106. The detailed processes in the stored data synthesizing section 104 are described below by referring to FIGS. 7A and 7B.

The stored data processing section 105 is formed of an ASIC and applies an image correcting process to the image data input from the image data correcting section 102 and the image data input from the network I/F 113, the external device I/F 114, and the external recording media I/F 115 by using the image distinctive data. In addition, the stored data processing section 105 applies a predetermined image process suitable for the printing section 110 to the image data input from the image data correcting section 102 and the image data input from the network I/F 113, the external device I/F 114, and the external recording media I/F 115. Actually, the image data and the image distinctive data are stored in the auxiliary storage unit 106 (the memory 108) and the image data and the image distinctive data are input to the stored data processing section 105 from the auxiliary storage unit 106.

The detailed processes in the stored data processing section 105 are described below by referring to FIG. 4.

The auxiliary storage unit 106 has a large capacity for storing electronic data and mainly stores the image data, the image distinctive data, and information concerning the image data, for example, bibliography information such as an image file name. In the present embodiment, the auxiliary storage unit 106 is a HD (hard disk) connected to the ATA bus which is standardized in PCs as expanded IDE (integrated drive electronics).

The controller 107 is a microprocessor for controlling elements in the image processing apparatus 100. In the present embodiment, the controller 107 is an integrated CPU in which functions of a CPU core, recently widely used, are expanded. The integrated CPU is, for example, an RM11100 manufactured by PMC Corporation in which a function connecting to a general-purpose I/F and a function connecting to buses are integrated by using crossbar switches.

The memory 108 is a volatile memory and temporarily stores data to be processed for absorbing processing speed differences when plural buses having corresponding different standards are bridged and for absorbing processing rate differences among the elements in the image processing apparatus 100. In addition, the memory 108 temporarily stores programs and partially processed data when the controller 107 controls the elements in the image processing apparatus 100. Since the controller 107 (CPU) is required to process data at a high processing rate, the controller 107 starts the system by executing a boot program stored in the ROM 117, and processes data by using a program loaded in the memory 108 which the controller 107 can access at high speed. In the present embodiment, a DIMM (dual inline memory module), which is a standard use in PCs, is used as the memory 108.

The plotter I/F 109 receives image data formed of CMYK data from the controller 107 via a general-purpose I/F integrated in the controller 107 and outputs the received image data to the printing section 110 by executing a bus bridge process for outputting the received image data to an I/F exclusively for the printing section 110. In the present embodiment, the general-purpose I/F is connected to a PCI Express bus between the controller 107 and the plotter I/F 109.

The printing section 110 receives the image data and prints the received image data on a sheet (recording medium) by using an electrophotographic system. In the electrophotographic system, a latent image is formed on a photoconductor body by using laser beams, a toner image is formed by developing the latent image, and the toner image is transferred (printed) onto the recording medium.

The SB 116 is formed of an LSI chip (chip set) which controls the flow of internal information and manages data transmission and reception among the elements in the image processing apparatus 100. The SB 116 is formed of a circuit in which a bridge function between buses is generalized. The bridge function is used when a CPU system including a PCI Express bus and an ISA bridge is established. The SB 116 connects the ROM 117 to the controller 107.

The ROM 117 stores programs including the boot program so that the controller 107 controls the elements in the image processing apparatus 100 by using the programs. That is, the programs are executed to perform an image processing method in the image processing apparatus 100.

The inputting section 111 and the displaying section 112 are user interface sections between a user and the image processing apparatus 100. The inputting section 111 includes an LCD (liquid crystal display), hard key switches, a software key for a GUI (graphical user interface), and the displaying section 112 includes an LCD and a software key for the GUI. The LCD displays various conditions of the image processing apparatus 100, for example, user information, job information, and operating processes of the image processing apparatus 100. The inputting section 111 detects an input from the hard key switches by a user. The inputting section 111 and the displaying section 112 are connected to the controller 107 via corresponding PCI Express buses.

The network I/F 113 connects the PCI Express bus connected to the controller 107 with a telephone line. The image processing apparatus 100 receives/transmits data from/to a device connected to the telephone line. For example, as shown in FIG. 1, the image processing apparatus 100 receives/transmits data from/to a facsimile machine 118 connected to the telephone line.

The external device I/F 114 connects the PCI Express bus connected to the controller 107 with an external device, for example, as shown in FIG. 1, a PC 119. The image processing apparatus 100 receives/transmits data from/to the external device 119. In the present embodiment, the external device I/F 114 is connected to an Ethernet network or a USB (universal serial bus) for connecting to the external device 119. A user of the external device 119 (PC) inputs/outputs a control signal and image data to/from the image processing apparatus 100 by using application software (for example, Word, Excel, and PowerPoint of Microsoft Corporation) installed in the external device 119 or via a printer driver (not shown) of the image processing apparatus 100. The printer driver uses, for example, a PDL (page description language) of the image processing apparatus 100.

The external recording media I/F 115 connects the PCI Express bus connected to the controller 107 with an external recording media drive 120 as shown in FIG. 1, for example, a memory card drive. The image processing apparatus 100 receives/transmits data from/to an external recoding medium 121 via the external recording media drive 120 and the external recording media I/F 115. In the present embodiment, the external recording media I/F 115 is connected to the external recording media drive 120 with a USB.

The external recording medium 121 is a memory device, for example, a CF (CompactFlash) card or a SD (secure digital) memory card, and stores electronic data including image data.

[Copying Operations]

Referring to FIGS. 2 through 5, copying operations of a document are described. In the copying operations, image data read by the document reading section 101 are printed on a sheet by the printing section 110.

First, a user puts a document on a document reading surface (contact glass) of the document reading section 101, sets an input image quality mode, for example, a letter mode or a photographic mode, and makes the image processing apparatus 100 start copying the document by using the key switches on the inputting section 111 and/or the displaying section 112.

The inputting section 111 converts information input by the key switches into control command data (copy starting command) and outputs the control command data. The control command data are input to the controller 107 via the PCI Express bus.

The controller 107 executes a program of copying operations based on the copy starting command and sequentially executes copying operations.

Next, the copying operations are described in detail.

The image data correcting section 102 applies an image correcting process, an image region separating process, and a region converting process to image data of RGB data of 8 bits per pixel read (scanned) by the document reading section 101 so that the image data are standardized to have predetermined characteristics, and outputs the corrected image data and image distinctive data to the bus controller 103.

Figure 2:
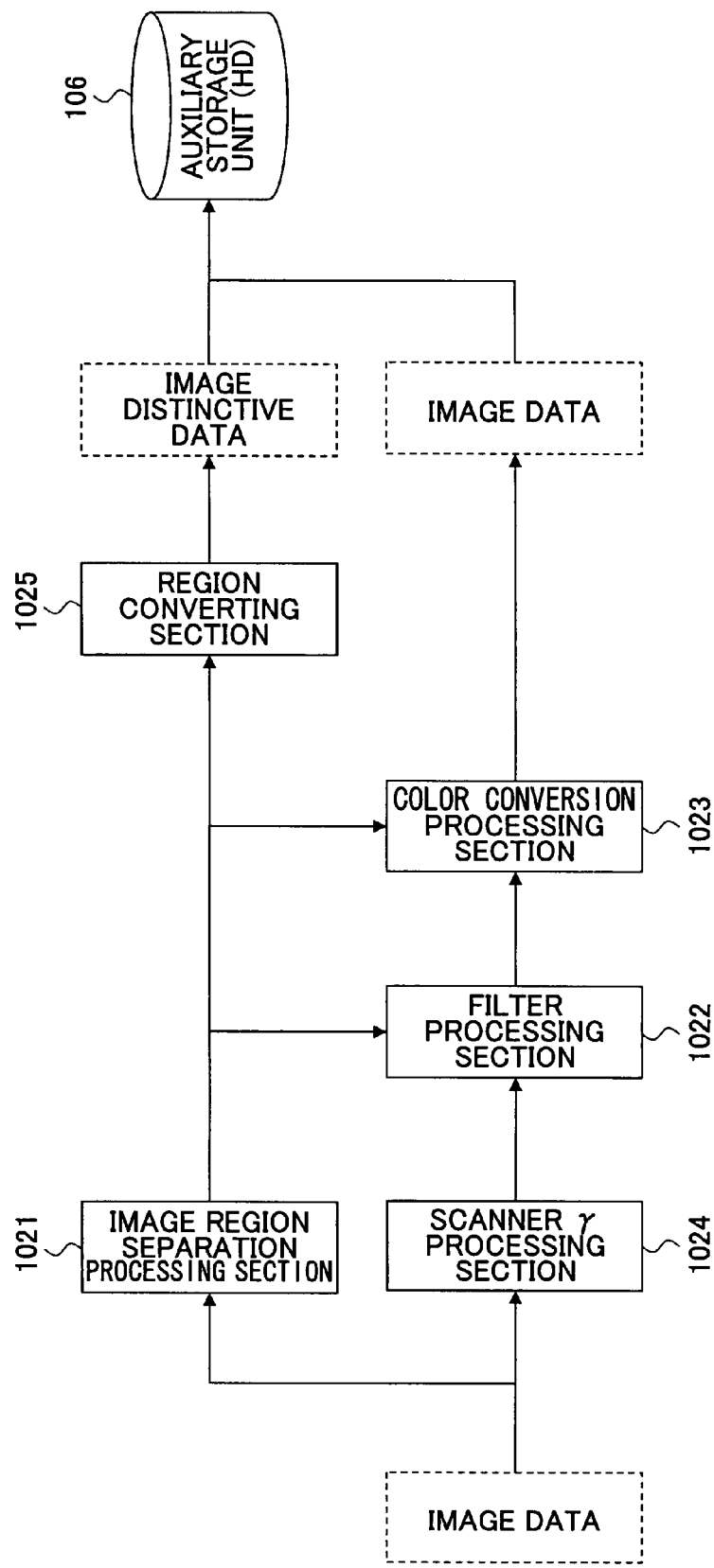
FIG. 2 is a block diagram showing an image data correcting section shown in FIG. 1.

FIG. 2 is a block diagram showing the image data correcting section 102.

First, referring to FIG. 2, processes in the image data correcting section 102 are described.

As shown in FIG. 2, the image data correcting section 102 includes an image region separation processing section 1021, a filter processing section 1022, a color conversion processing section 1023, a scanner γ processing section 1024, and a region converting section 1025.

The image region separation processing section 1021 extracts a distinctive image region of the document from the input image data, and generates a region separation signal in each pixel of the extracted distinctive image region. For example, half dot parts and edge parts of a letter formed by general printing are extracted, and whether the image data are chromatic color or achromatic color and whether the background image is white are determined. The region separation signal needs four bits so that four determined result information items are expressed. In addition, the input image data are input to the scanner γ processing section 1024.

The scanner γ processing section 1024 applies an image γ conversion process to the image data input from the document reading section 101. In the image γ conversion process, the density of the image data is corrected by changing the relationship between input and output image data. The brightness, the hue, and the color balance are adjusted by changing the density changing conditions of the image data. The image data converted by the image γ conversion process are output to the filter processing section 1022.

The filter processing section 1022 converts a spatial frequency of the image data by using a spatial filter, for example, a smoothing filter, or an enhancing filter (MTF, or modulation transfer function correction filter). In addition, the filter processing section 1022 applies a distinctive filtering process to each extracted image region based on distinctive image region information extracted by the image region separation processing section 1021.

The filtering process gives a special effect to the image data by applying a calculation to each pixel of the image data between adjacent pixels. For example, in a distinctive image region where a halftone dot part is extracted, a smoothing process is applied to the halftone dot part by using a smoothing filter; and in a distinctive image region where an edge part of a letter is on a white background, an edge enhancing process is applied to the distinctive image region by estimating that the distinctive image region is a letter region by using an enhancing filter so that an MTF characteristic is increased. The image data filtered by the filter processing section 1022 are output to the color conversion processing section 1023.

The color conversion processing section 1023 applies a color conversion process which matches output characteristics to the received image data. The image data are temporarily stored, then image data with standardized color characteristics are output by, converting the image data into general RGB data or into data of a predetermined color space.

The region converting section 1025 selects some of the distinctive image regions separated by the image region separation processing region 1021, converts the selected image regions into image region separation signals, and outputs the converted image region separation signals as the image distinctive data. That is, some distinctive image regions, which are required to apply a predetermined process to image data stored in the stored data processing section 105, are selected. For example, two image regions are selected from four image regions which are required to apply the predetermined process to the image data stored in the stored data processing section 105. The image regions which are needed in the stored data processing section 105 are two distinctive regions where the color is achromatic or chromatic (white or non-white) and the image is a letter or not. Therefore, the image distinctive data converted by the region converting section 1025 have two bits.

FIG. 3 is a table showing a bit definition of the image distinctive data which are used in the image processing apparatus 100.

As shown in FIG. 3, in two bits (b1, b0), information in which an image is a letter or a non-letter is defined in the bit "b1", and information in which an image is chromatic or achromatic is defined in the bit "b0". By combinations of the information in the two bits (b1, b0), the image distinctive data by which a predetermined image process is applied to image data by the stored image processing section 105 can be expressed by four patterns of "chromatic letter", "achromatic letter", "chromatic non-letter", and "achromatic non-letter".

The bus controller 103 stores the (RGB) image data and the image distinctive data in the memory 108 via the controller 107 by receiving the image data and the image distinctive data from the image data correcting section 102.

The image data and the image distinctive data stored in the memory 108 are output to the stored data processing section 105 via the controller 107 and the bus controller 103.

The stored data processing section 105 applies predetermined processes including a color conversion process to the received image data (RGB data) based on the image distinctive data corresponding to the image data for printing the image data on a sheet by the printing section 110. The color conversion process converts the RGB data into CMYK data.

Figure 4:
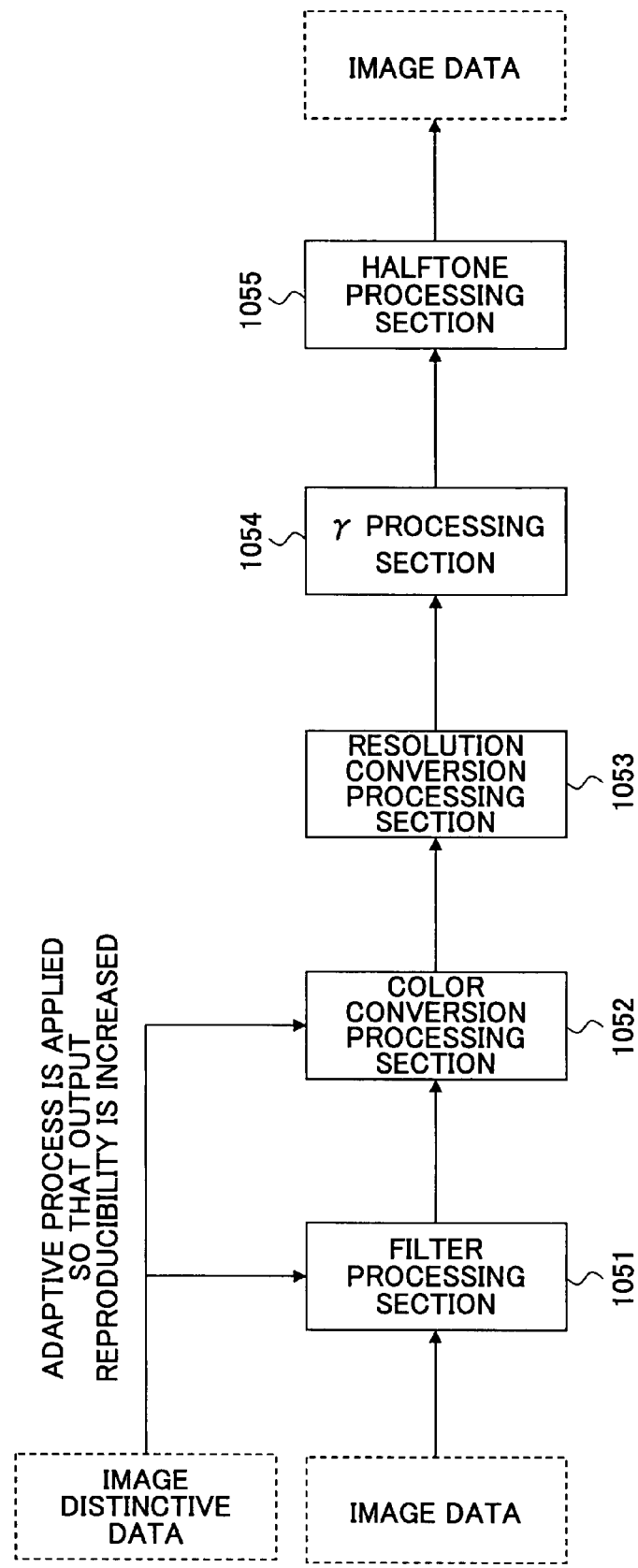
FIG. 4 is a block diagram showing a stored data processing section shown in FIG. 1.

FIG. 4 is a block diagram showing the stored data processing section 105. Referring to FIG. 4, processes in the stored data processing section 105 are described.

As shown in FIG. 4, the stored data processing section 105 includes a filter processing section 1051, a color conversion processing section 1052, a resolution conversion processing section 1053, a γ processing section 1054, and a halftone processing section 1055.

The filter processing section 1051 applies a filter process to corrected image data received from the image data correcting section 102 via the bus controller 103 so that the image data become matched with the MTF characteristics of the printing section 110. The filter processing section 1022 in the image data correcting section 102 corrects the image data to have predetermined characteristics so that the image data are stored in the auxiliary storage unit 106 or the memory 108. The filter processing section 1051 in the stored data processing section 105 converts the image data into image data having characteristics which match with output characteristics of the printing section 110. In addition, the filter processing section 1051 applies an adaptive process to the image data by using the image distinctive data so that output reproducibility at the printing section 110 is increased.

In the adaptive process to increase the output reproducibility, based on the bit definition of the image distinctive data shown in FIG. 3, a high sharpening process (letter edge enhancing process) is applied to pixels of a letter having an image distinctive data value "b1=1", and a middle sharpening process is applied to pixels other than a letter "b1=0". The image data to which the filter process is applied by the filter processing section 1051 are sent to the color conversion processing section 1052.

The color conversion processing section 1052 applies a color conversion process to the received image data so that the image data match the color spatial characteristics of the printing section 110. In the present embodiment, the RGB image data are converted into CMYK image data so as to match the color spatial characteristics of the printing section 110. In addition, the color conversion processing section 1052 applies an adaptive process to the image data by using the image distinctive data so that the output reproducibility at the printing section 110 is increased. In the color conversion process, a masking operation method, a memory map method, or an interpolation method can be used.

In the adaptive process to increase the output reproducibility, based on the bit definition of the image distinctive data shown in FIG. 3, a normal color conversion process is applied to pixels having a chromatic color of an image distinctive data value "b0=1", and a color conversion process in which a black ratio is increased is applied to pixels having an achromatic color "b0=0". The image data to which the color conversion process is applied by the color conversion processing section 1052 are sent to the resolution conversion processing section 1053.

The resolution conversion processing section 1053 applies an arbitrary variable power process to the received image data and sends the processed image data to the γ processing section 1054.

The γ processing section 1054 applies a γ conversion process to the received image data so that the characteristics of the received image data match the output characteristics of the printing section 110 and sends the γ processed image data to the halftone processing section 1055.

The halftone processing section 1055 applies a tone conversion process to the received image data so that the characteristics of the received image data match with the output characteristics of the printing section 110. In the present embodiment, a dither process and an error diffusion process are used in the tone conversion process, and the number of bits (the depth of tones) is converted so that the number of bits matches the number of bits of the printing section 110. In this case, the number of bits is converted from 8 bits to 2 bits.

The bus controller 103 receives the image data (CMYK data) processed at the stored data processing section 105 and stores the image data in the memory 108 via the controller 107.

The image data stored in the memory 108 are sent to the plotter I/F 109 via the controller 107 and the plotter I/F 109 sends the image data to the printing section 110.

The printing section 110 prints the image data on a sheet (paper). With this, the document is copied on the sheet.

Next, referring to FIGS. 5 through 10, image data synthesizing and printing operations are described. In the image data synthesizing and printing operations, image data read (scanned) by the document reading section 101 are stored and synthesized in the image processing apparatus 100 and the synthesized image data are printed on a sheet by the printing section 110.

[Image Data Storing Operations to Auxiliary Storage Unit]

First, a user puts a document on a document reading surface (contact glass) of the document reading section 101, sets an input image quality mode, for example, a letter mode or a photographic mode, and makes the image processing apparatus 100 start storing the document by using the key switches on the inputting section 111 and/or the displaying section 112.

The controller 107 executes the processes from reading the document at the document reading section 101 to correcting the image data at the image data correcting section 102 in the copying operations described above in FIGS. 1 through 3. Then the controller 107 stores the image data and the image distinctive data output from the image data correcting section 102 in the memory 108. The image data and the image distinctive data stored in the memory 108 are stored in the auxiliary storage unit 106 via the controller 107 and the bus controller 103.

Figure 5:
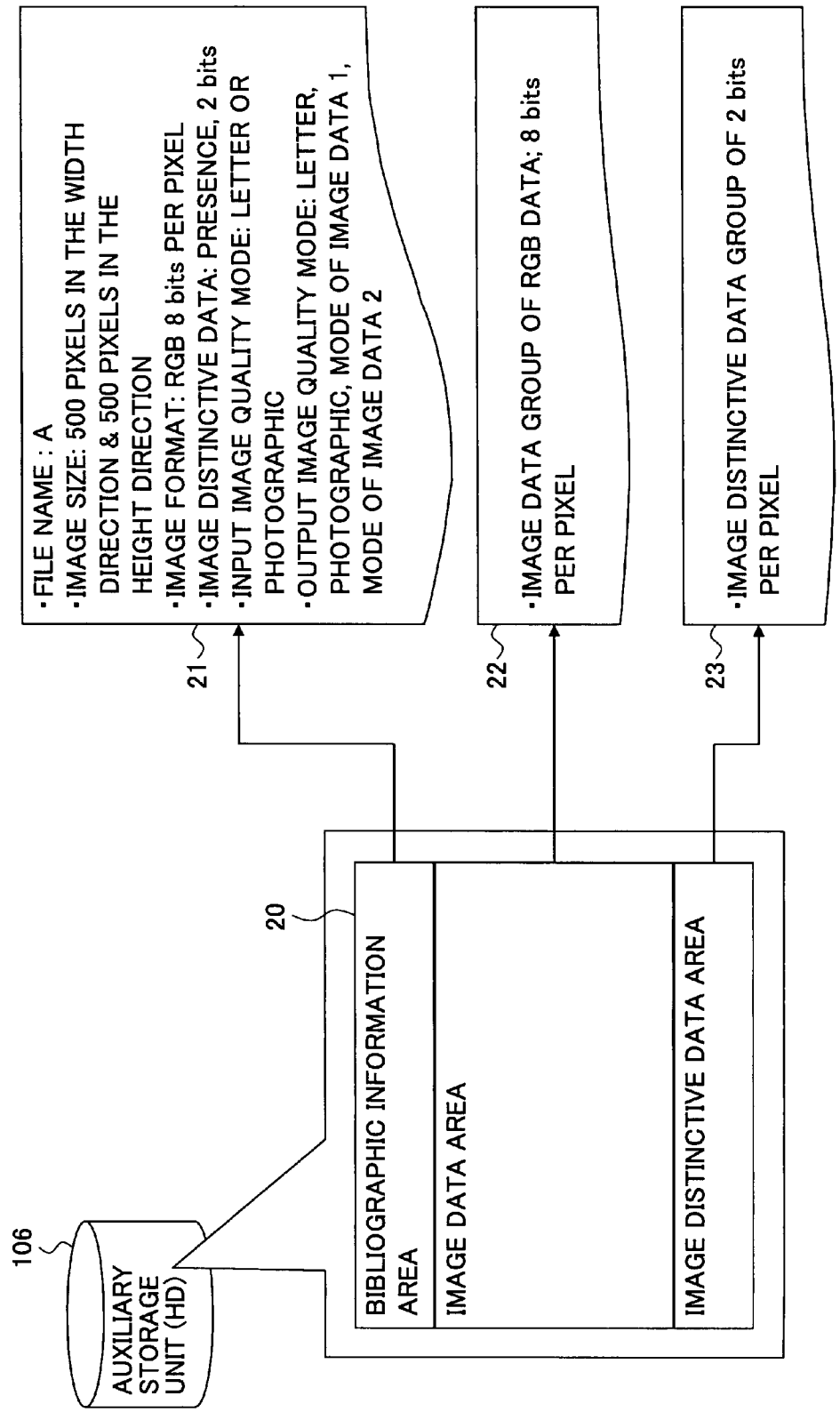
FIG. 5 is a diagram showing a structure of an image data file which is stored in an auxiliary storage unit shown in FIG. 1.

FIG. 5 is a diagram showing a structure of an image data file 20 which is stored in the auxiliary storage unit 106.

As shown in FIG. 5, the image data file 20 includes a bibliographic information area 21, an image data area 22, and an image distinctive data area 23. Necessary information and data of each image data set are stored in the above three areas.

Data of encoded information of the image data file 20 are stored in the bibliographic information area 21. The encoded data are a file name, image size information showing the number of pixels in width direction and the height direction (W×H dots (pixels)) of the image data (for example, 500 pixels in the width direction and 500 pixels in the height direction), image format information showing tones and a color of the image data (for example, 256 tones and RGB 8 bits), image distinctive data information showing the presence of the image distinctive data corresponding to the image data (for example, presence and 2 bits), and information of an input image quality mode (for example, a letter mode or a photographic mode). The data in the bibliographic information area 21 are stored in the auxiliary storage unit 106 by being encoded when the image data and the image distinctive data are stored in the auxiliary storage unit 106.

The image data are stored in the image data area 22 and are formed of image data groups of RGB data of 8 bits per pixel.

The image distinctive data are stored in the image distinctive data area 23 and are formed of image distinctive data groups of 2 bits per pixel.

[Synthesizing and Printing Operations of Stored Image Data]

In the operations, image data stored in the auxiliary storage unit 106 are synthesized and the synthesized image data are printed on a sheet by the printing section 110.

Figure 6:
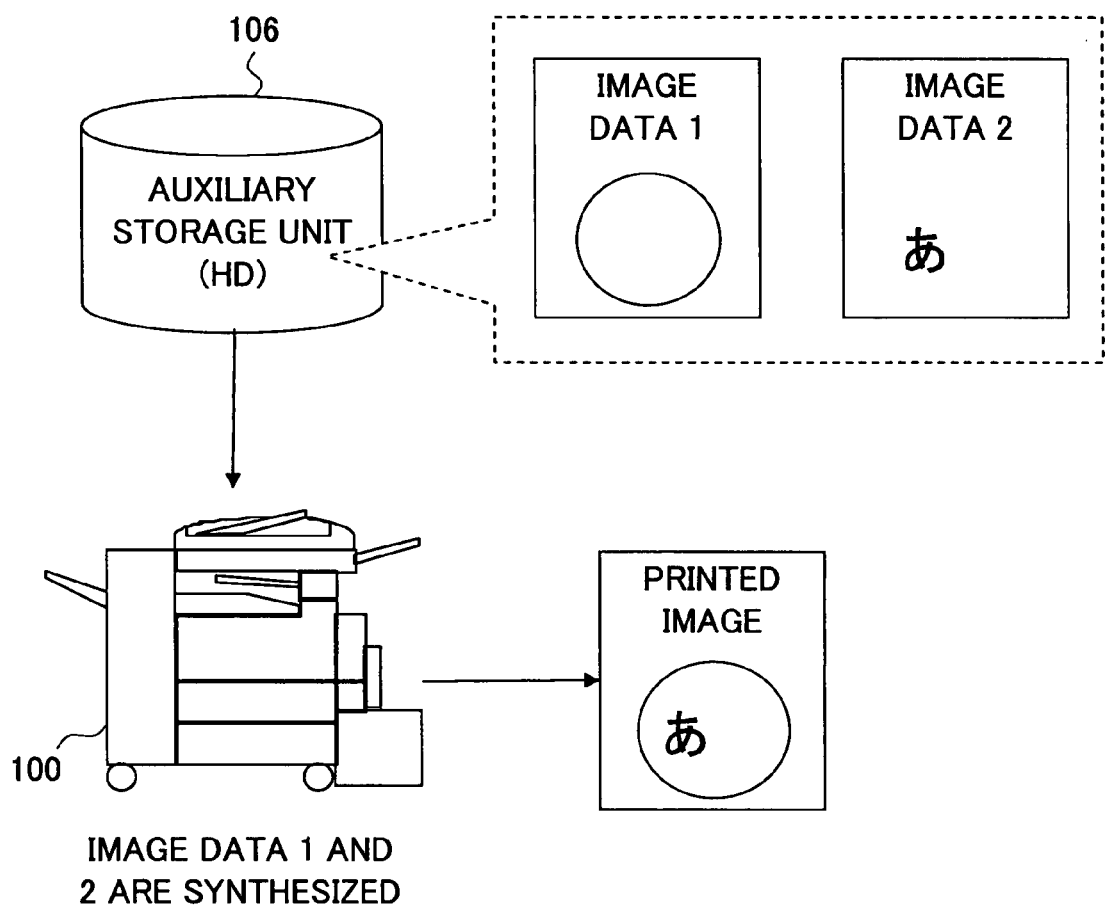
FIG. 6 is a diagram showing operations in which two image data items read by a document reading section shown in FIG. 1 are synthesized.

FIG. 6 is a diagram showing operations in which two image data items read by the document reading section 101 are synthesized.

First, a user instructs the image processing apparatus 100 to synthesize image data 1 and image data 2 stored in the auxiliary storage unit 106 and to start to print synthesized image data on a sheet by using the key switches (user interfaces) on the inputting section 111 and/or the displaying section 112 by setting an output image quality mode. In the above, the image data 2 including the image distinctive data of a document 2 are synthesized with the image data 1 including the image distinctive data of a document 1. In the setting of the output image quality mode, for example, a letter mode, a photographic mode, an image quality mode of the image data 1 of the document 1, or an image quality mode of the image data 2 of the document 2 to be synthesized is selected.

The inputting section 111 issues control command data in the image processing apparatus 100 by converting the information input via the key switches. The issued control command data are sent to the controller 107 via the PCI Express bus.

The controller 107 executes a program of image data synthesizing and printing operations (image data synthesizing and printing functions) based on the control command data of an image data synthesizing and printing start command, and sequentially executes settings and processes necessary for the stored image data synthesizing and printing operations.

The stored image data synthesizing and printing operations are described in detail.

First, the bus controller 103 stores the image data 1 (image data and image distinctive data) of the document 1 and the image data 2 (image data and image distinctive data) of the document 2 to be synthesized stored in the auxiliary storage unit 106 in the memory 108 via the controller 107.

The image data 1 and 2 stored in the memory 108 are sent to the stored data synthesizing section 104 via the controller 107 and the bus controller 103, the stored data synthesizing section 104 synthesizes the image data 1 and 2, and the synthesized image data are sent to the stored data processing section 105 via the bus controller 103. The stored data processing section 105 converts the synthesized image data (RGB data) into CMYK data which match the output characteristics of the printing section 110.

In FIG. 6, the synthesizing and printing operations of the image data 1 and 2 stored in the auxiliary storage unit 106 are shown. The image data 1 have a circle and the image data 2 have a Japanese phonetic script "あ". When the image data 1 and 2 are synthesized and printed on a sheet, the printed image is shown at the lower right side of FIG. 6. In FIG. 6, the auxiliary storage unit 106 is separated from the image processing apparatus 100; however, actually, the auxiliary storage unit 106 is included in the image processing apparatus 100.

Figure 7B:
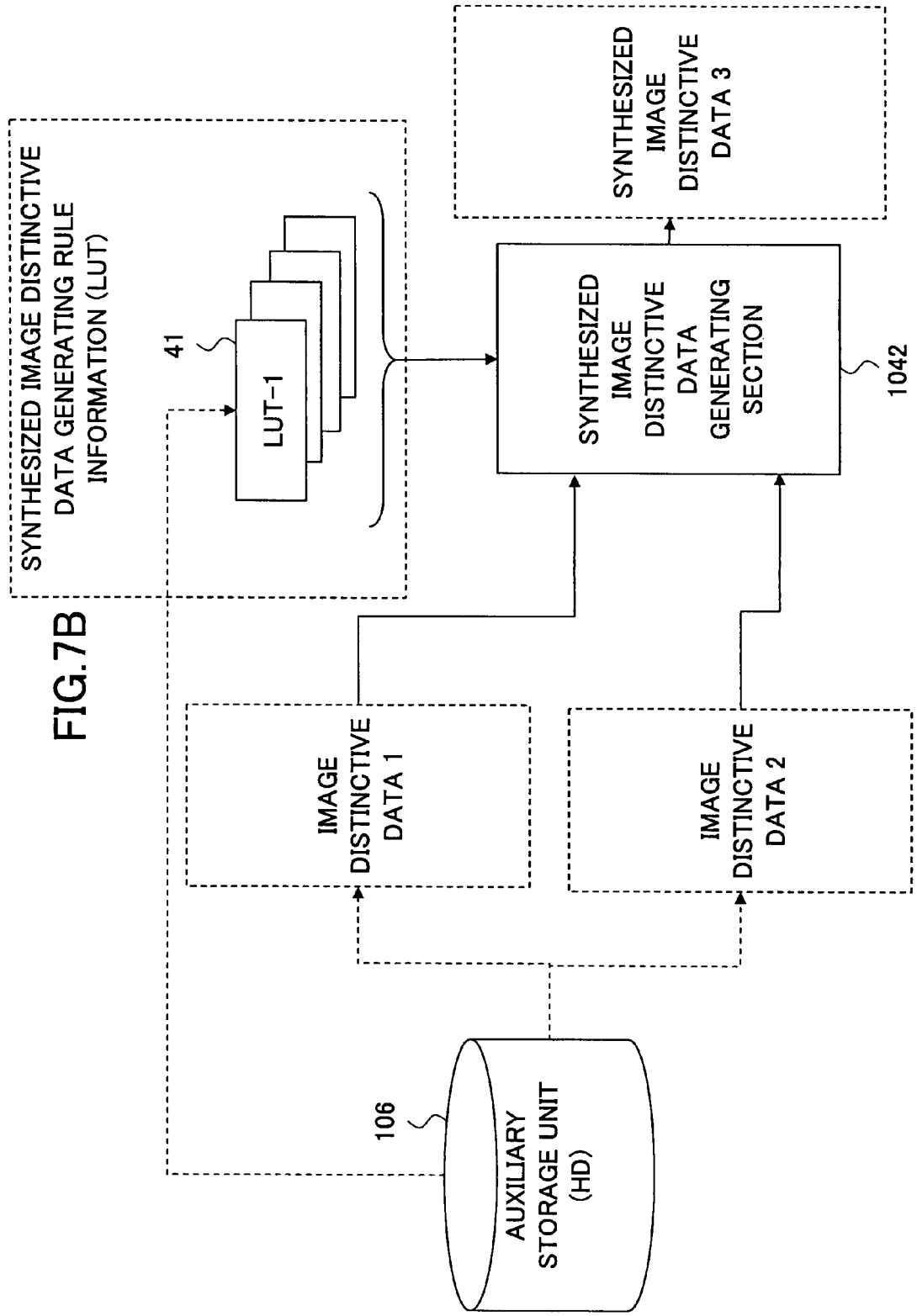
FIG. 7B is a diagram showing operations of a synthesized image distinctive data generating section in the stored data synthesizing section.

Referring to FIGS. 7A and 7B, the structure of the stored data synthesizing section 104 is described in detail. FIG. 7A is a diagram showing operations of an image data synthesizing section 1041 in the stored data synthesizing section 104. FIG. 7B is a diagram showing operations of a synthesized image distinctive data generating section 1042 in the stored data synthesizing section 104.

As shown in FIGS. 7A and 7B, the stored data synthesizing section 104 includes the image data synthesizing section 1041 and the synthesized image distinctive data generating section 1042.

As shown in FIG. 7A, the image data synthesizing section 1041 synthesizes the image data 1 with the image data 2 stored in the memory 108 sent from the auxiliary storage unit 106 via the bus controller 103 and the controller 107 and generates synthesized image data 3. The image data synthesizing section 1041 sends the synthesized image data 3 to the stored data processing section 105 via the bus controller 103. In FIG. 7A, only the auxiliary storage unit 106 and the image data synthesizing section 1041 are shown.

As shown in FIG. 7B, the synthesized image distinctive data generating section 1042 generates synthesized image distinctive data 3 by referring to synthesized image distinctive data generating rule information 41 (LUT, or lookup table) based on the image data 1 and 2, and sends the generated synthesized image distinctive data 3 to the stored data processing section 105 via the bus controller 103. In the following, in some cases, the synthesized image distinctive data generating rule information 41 is referred to as an LUT 41.

In the LUT 41, from plural synthesized image distinctive data sets which express the distinctiveness of the image region of the synthesized image data stored in the memory 108 sent from the auxiliary storage unit 106 via the bus controller 103 and the controller 107, one synthesized image distinctive data set is shown in a table format so as to correspond to the image distinctive data 1 and 2 by combinations of the image distinctive data 1 and 2.

Figure 8:
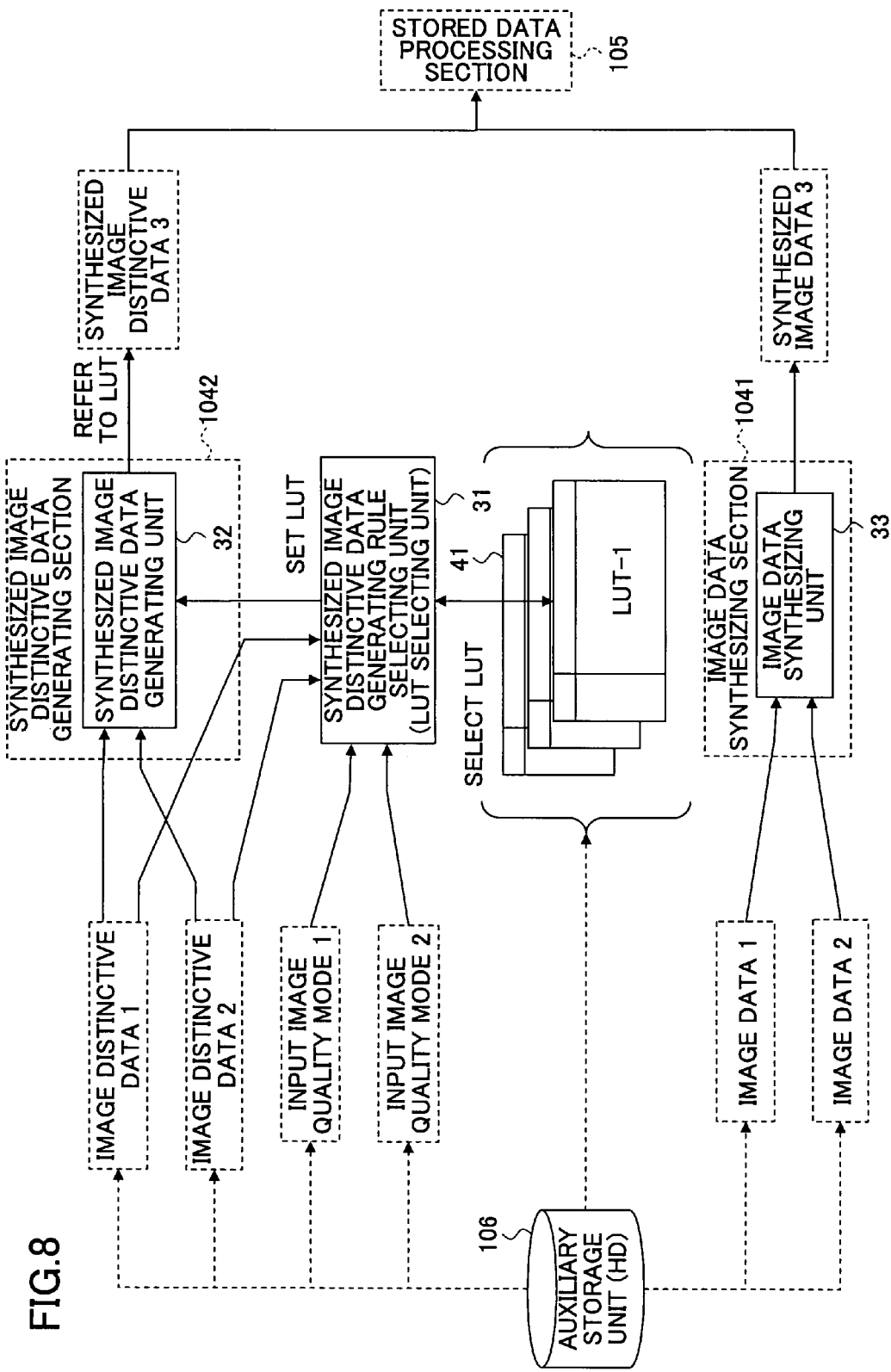
FIG. 8 is a block diagram showing main units in stored image data synthesizing operations in the image processing apparatus.

Next, referring to FIG. 8, functions of the image data synthesizing section 1041 and the synthesized image distinctive data generating section 1042 are described.

FIG. 8 is a block diagram showing main units in stored image data synthesizing operations in the image processing apparatus 100. In FIG. 8, only the auxiliary storage unit 106 and the main units are shown.

As shown in FIG. 8, the image data synthesizing section 1041 includes an image data synthesizing unit 33 which synthesizes the image data 1 and 2 stored in the memory 108 sent from the auxiliary storage unit 106 via the bus controller 103 and the controller 107.

The image data synthesizing unit 33 compares the sizes of the RGB values (0 to 255) of pixels corresponding to the pixel array (x, y) in the image data 1 and 2, synthesizes image data by determining a larger pixel value as a synthesized pixel value (calculate with black (0,0,0) as FFH (0x1111111) in 8-bit and 256 tones), and sends the synthesized image data 3 to the stored data processing section 105 via the bus controller 103.

FIG. 9 is a diagram showing an example of synthesized image data 3 synthesized by the image data synthesizing unit 33.

As shown in FIG. 9, when the synthesized image data 3 are generated by the image data synthesizing unit 33, since the pixel value having a larger RGB value becomes a synthesized pixel value, the synthesized image data 3 have a see-through pattern. In FIG. 9, synthesized image data 3 are shown in which image data 2 of a document 2 having figures are synthesized with image data 1 of a document 1 having a letter image "ABCD".

As shown in FIG. 8, the image processing apparatus 100 further includes a synthesized image distinctive data generating rule selecting unit 31 which selects one of the LUTs 41 based on information of the image data 1 and 2 to be synthesized. In the following, in some cases, the synthesized image distinctive data generating rule selecting unit 31 is referred to as an LUT selecting unit 31.

In order to generate the synthesized image data 3 which a user desires to obtain, the stored data processing section 105 applies an optimum image process (adaptive process to increase output reproducibility) to the image data synthesized by the stored data synthesizing section 104.

In the optimum image process, the filter processing section 1051 applies a filter process and the color conversion processing section 1052 applies a color conversion process. The processes are applied only to the distinctive image regions where the stored data processing section 105 must apply the processes in the distinctive image regions separated from the image region separating process of the image data correcting section 102. That is, the processes are applied only to the distinctive image regions of "chromatic letter", "achromatic letter", "chromatic non-letter", and "achromatic non-letter". In order to determine the image regions where the processes are applied, the image distinctive data expressing the distinctiveness of the image regions of the image data generated by the region converting process of the image data correcting section 102 are used. Therefore, in the synthesized image data, the synthesized image distinctive data expressing the distinctiveness of the image regions of the synthesized image data are generated.

However, in the synthesized image data, since the plural image data sets are used, plural image distinctive data sets exist. In order to optimally execute predetermined image processes after the image data are synthesized, the followings must be studied. That is, what distinctiveness exists in image data to be synthesized, and what input image quality mode the image data to be synthesized have. Therefore, the synthesized image distinctive data suitable for the image processes of the synthesized image data must be generated based on at least one piece of information in the following information concerning the image data to be synthesized.

(1) Information whether image distinctive data exist in image data to be synthesized.

(2) Information of input image quality when image data to be synthesized are input, for example, input image quality modes such as a letter mode and a photographic mode.

(3) Information of output image quality when synthesized image data are output, for example, output image quality modes such as a letter mode, a photographic mode, an image quality mode of image data 1 of a document 1, and an image quality mode of image data 2 of a document 2 to be synthesized.

The LUT selecting unit 31 stores the plural LUTs 41 in the auxiliary storage unit 106 beforehand. In the plural LUTs 41, combinations of image data to be synthesized by the information items (1) through (3) are stored beforehand. When synthesized image distinctive data are generated, the LUT selecting unit 31 determines a combination of the image data to be synthesized based on the information items (1) through (3), and generates synthesized image distinctive data corresponding to the synthesized image data of the image data 1 and 2 by using the plural LUTs 41.

That is, the LUT selecting unit 31 selects one of the plural LUTs 41. With this, a synthesized image distinctive data generating unit 32 (described below) can generate suitable synthesized image distinctive data which are used when the stored data processing section 105 executes the optimum image process (the filtering process and the color conversion process).

The LUT selecting unit 31 is operated by the controller 107. The selected LUT 41 is stored in the memory 108 by the controller 107. The stored data synthesizing section 104 can refer to the selected LUT 41 via the bus controller 103 by operations of the controller 107.

FIG. 10 is a first LUT 41 in the image processing apparatus 100.

As shown in FIG. 10, based on the image distinctive data 1 and 2 of the corresponding image data 1 and 2, when one of the combinations is selected, one synthesized image distinctive data set can be generated. When the synthesized image distinctive data generating rule is expressed by the LUT 41, synthesized image distinctive data can be easily generated by using the image distinctive data 1 (2 bits) of the image data 1 and the image distinctive data 2 (2 bits) of the image data 2 as reference address data (reference key) in the lookup table. In addition, synthesized image distinctive data can be easily added corresponding to an additional combination of the image distinctive data. Further, in a case where new image data information is added, in addition to the information items (1) through (3), when a new lookup table 41 is provided corresponding to a new combination of image data to be synthesized, synthesized image distinctive data can be easily generated.

In FIG. 10, the image distinctive data 1 of the image data 1 have four patterns of 11 (chromatic letter), 10 (achromatic letter), 01 (chromatic non-letter), and 00 (achromatic non-letter), and the image distinctive data 2 of the image data 2 have four patterns of 11 (chromatic letter), 10 (achromatic letter), 01 (chromatic non-letter), and 00 (achromatic non-letter).

In addition, as shown in FIG. 8, the synthesized image distinctive data generating section 1042 in the stored data synthesizing section 104 provides the synthesized image distinctive data generating unit 32. The synthesized image distinctive data generating unit 32 generates the synthesized image distinctive data 3 by referring to the LUT 41 selected by the LUT selecting unit 31 and by determining the image distinctive data 1 and 2 expressing the distinctive image regions extracted from the image data 1 and 2 to be synthesized by the image region separation processing section 1021 of the image data correcting section 102 as the reference address data. The generated synthesized image distinctive data 3 are sent to the stored data processing section 105 via the bus controller 103.

For example, when the image distinctive data 1 (2 bits) of the image data 1 is "b1b0=10" (achromatic letter) and the image distinctive data 2 (2 bits) of the image data 2 is "b1b0=01" (chromatic non-letter), the synthesized image distinctive data generating unit 32 generates the synthesized image distinctive data 3 (2 bits) of "b1b0=01" (chromatic non-letter) by referring to the LUT 41 shown in FIG. 10.

Consequently, in the combination where the image distinctive data 1 of the image data 1 are the achromatic letter and the image distinctive data 2 of the image data 2 are the chromatic non-letter, the stored data processing section 105 applies the optimum image processes (the filtering process and the color conversion process) to the image region of the chromatic non-letter of the synthesized image data 3, based on the rule in the LUT 41. With this, synthesized image data having image quality of high output reproducibility can be generated.

As described above, the stored data synthesizing section 104 can generate the synthesized image distinctive data suitable for the synthesized image data from the image data to be synthesized stored in the memory 108, based on the synthesized image distinctive data generating rule corresponding to the combination of the information items (1) through (3) of the image data to be synthesized.

The synthesized image distinctive data 3 generated by the synthesized image distinctive data generating unit 32 and the synthesized image data 3 generated by the image data synthesizing unit 33 are sent to the stored data processing section 105 via the bus controller 103. The stored data processing section 105 applies the optimum image processes (the filtering process and the color conversion process) to the synthesized image data 3 based on the received synthesized image distinctive data 3. Further, the stored data processing section 105 sequentially applies the image processes from the resolution conversion process to the halftone process shown in FIG. 4. With this, the synthesized image data 3 are converted into the image data (CMYK data) which match the output characteristics of the printing section 110.

The synthesized image data processed by the stored image processing section 105 are stored in the memory 108 via the bus controller 103 and the controller 107.

The synthesized image data stored in the memory 108 are sent to the printing section 110 via the controller 107 and the plotter I/F 109, and the printing section 110 prints the received synthesized image data on a sheet. With this, the user can obtain a synthesized result which the user desires to obtain.

Next, referring to FIGS. 11 through 14, processes in the image processing apparatus 100 are described.

Figure 11:
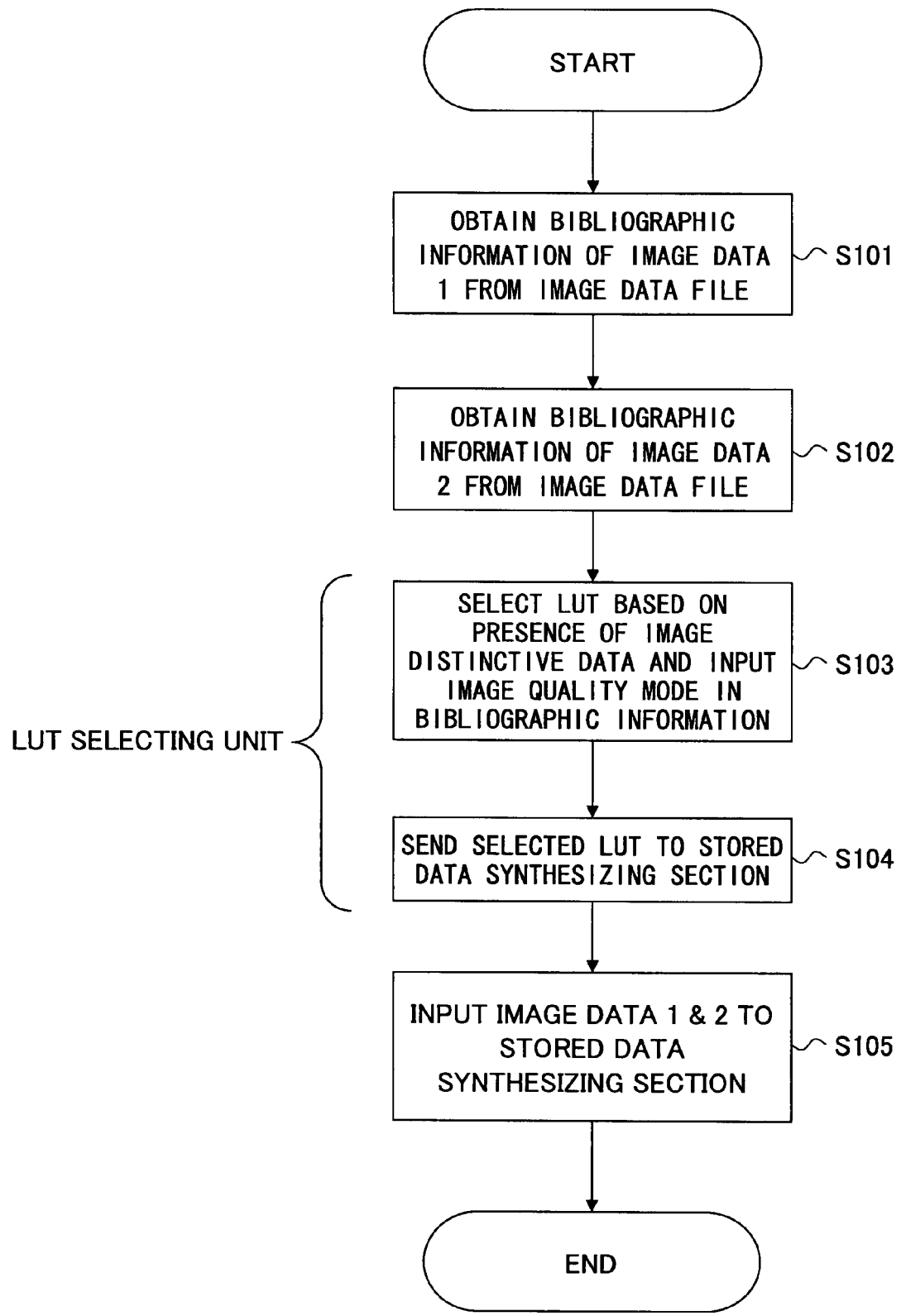
FIG. 11 is a first flowchart showing processes in the image processing apparatus.

FIG. 11 is a first flowchart showing processes in the image processing apparatus 100. In FIG. 11, processes before synthesizing the image data are shown, in which the presence of image distinctive data of image data 1 and 2 and input image quality modes of the image data 1 and are considered.

As shown in FIG. 11, first, the controller 107 obtains bibliographic information of image data 1 from the bibliographic information area 21 in the image data file 20 stored in the auxiliary storage unit 106 (S101) and also obtains bibliographic information of image data 2 from the bibliographic information area 21 in the image data file 20 stored in the auxiliary storage unit 106 (S102).

Next, the controller 107 selects one LUT 41 from plural LUTs 41 based on a combination in the bibliographic information in which the presence of image distinctive data and input image quality modes of the image data 1 and 2 are described by using the LUT selecting unit 31 (S103). Then the controller 107 sends the selected LUT 41 to the stored data synthesizing section 104 so that the synthesized image distinctive data generating unit 32 can generate suitable synthesized image distinctive data (S104).

Next, the controller 107 inputs the image data 1 and the image data 2 to be synthesized to the stored data synthesizing section 104 (S105).

Figure 12:
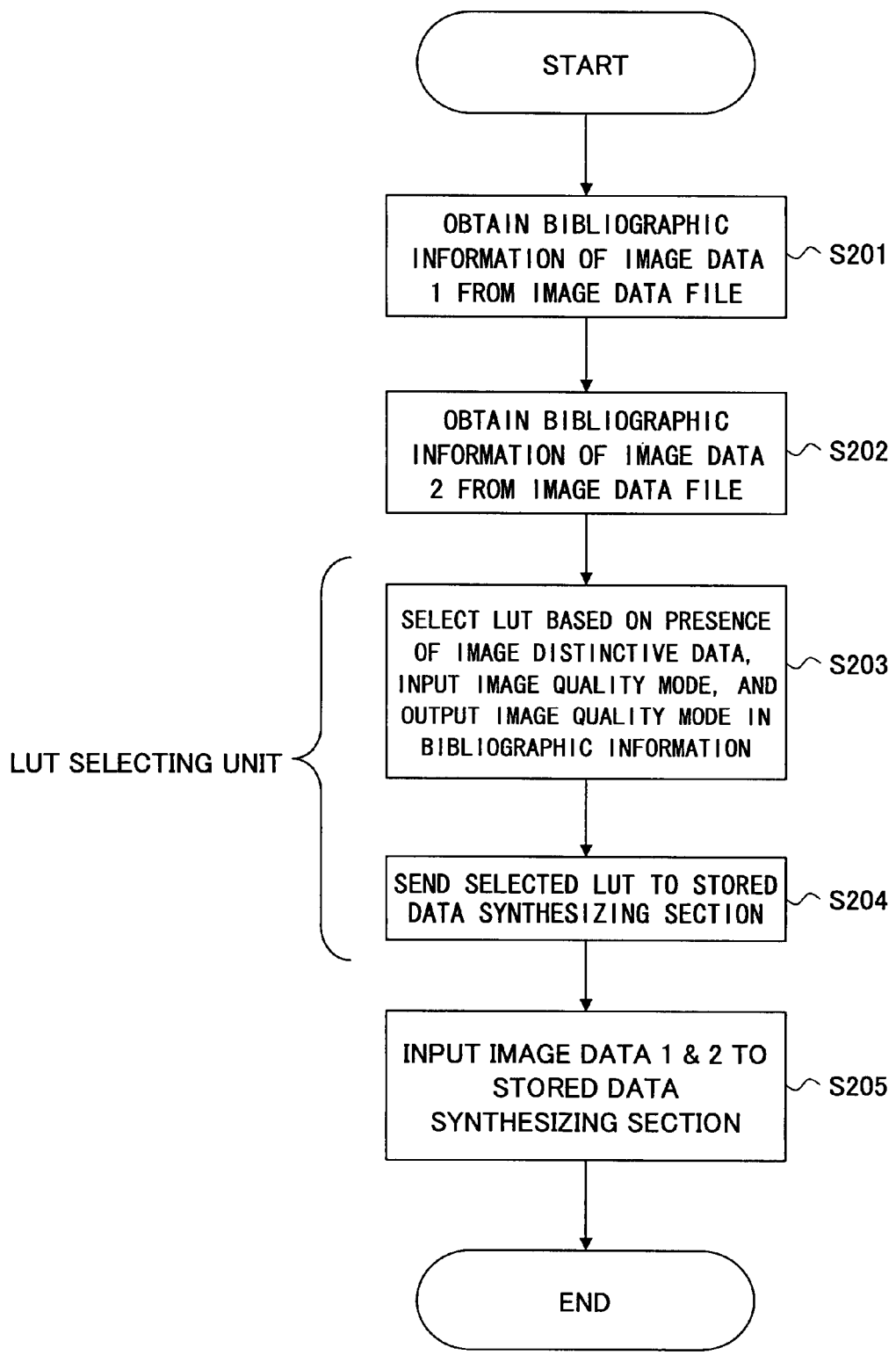
FIG. 12 is a second flowchart showing processes in the image processing apparatus.

FIG. 12 is a second flowchart showing processes in the image processing apparatus 100. In FIG. 12, processes before synthesizing the image data are shown, in which a combination of the presence of image distinctive data, input image quality modes, and output image quality modes of the image data 1 and 2 are considered.

As shown in FIG. 12, first, the controller 107 obtains bibliographic information of image data 1 from the bibliographic information area 21 in the image data file 20 stored in the auxiliary storage unit 106 (S201) and also obtains bibliographic information of image data 2 from the bibliographic information area 21 in the image data file 20 stored in the auxiliary storage unit 106 (S202).

Next, the controller 107 selects one LUT 41 from plural LUTs 41 based on a combination in the bibliographic information in which the presence of image distinctive data, input image quality modes, and output image quality modes of the image data 1 and 2 are described by using the LUT selecting unit 31 (S203). Then the controller 107 sends the selected LUT 41 to the stored data synthesizing section 104 so that the synthesized image distinctive data generating unit 32 can generate suitable synthesized image distinctive data (S204).

Next, the controller 107 inputs the image data 1 and the image data 2 to be synthesized to the stored data synthesizing section 104 (S205).

Figure 13:
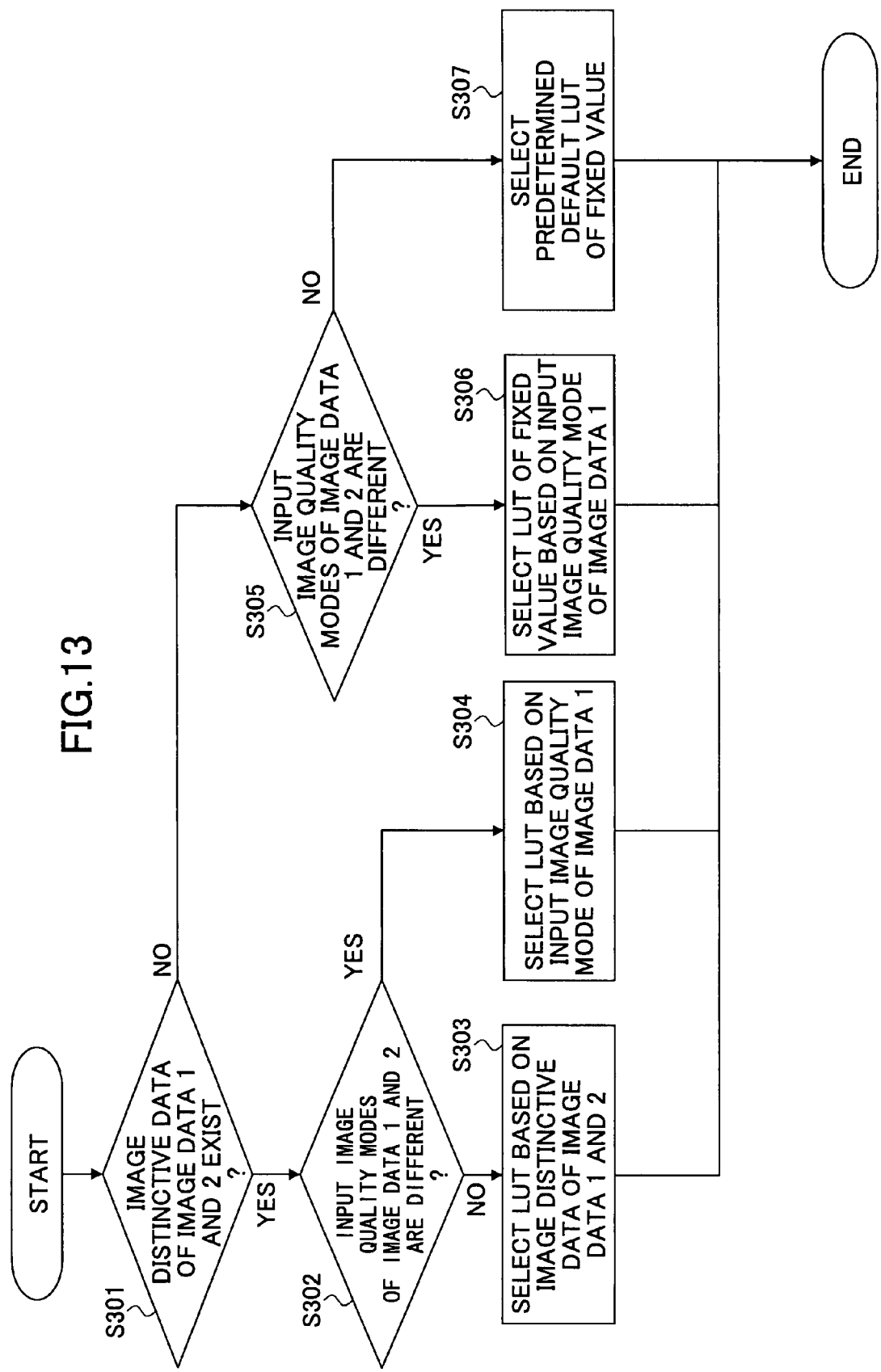
FIG. 13 is a first flowchart showing processes in an LUT selecting unit of the stored data synthesizing section.

FIG. 13 is a first flowchart showing processes in the LUT selecting unit 31 of the stored data synthesizing section 104 in the image processing apparatus 100. In FIG. 13, a combination of the presence of image distinctive data and input image quality modes of image data 1 and 2 are considered.

First, the LUT selecting unit 31 determines whether image distinctive data of the corresponding image data 1 and 2 exist based on the bibliographic information of the obtained image data 1 and 2 (S301).

When both of the image distinctive data of the image data 1 and 2 exist (YES in S301), the LUT selecting unit 31 determines whether the input image quality modes of the image data 1 and 2 are different from each other based on the bibliographic information (S302).

When the input image quality modes of the image data 1 and 2 are the same (NO in S302), the LUT selecting unit 31 selects an appropriate one LUT 41 from plural LUTs 41 based on a combination of the image distinctive data of the image data 1 and 2 to be synthesized (S303).

When the input image quality modes of the image data 1 and 2 are different from each other (YES in S302), the LUT selecting unit 31 selects an appropriate one LUT 41 from plural LUTs 41 based on the input image quality mode of the image data 1 (S304).

When the image distinctive data of the corresponding image data 1 and 2 do not exist (NO in S301), the LUT selecting unit 31 determines whether the input image quality modes of the image data 1 and 2 are different from each other based on the bibliographic information (S305).

When the input image quality modes of the image data 1 and 2 are different from each other (YES in S305), the LUT selecting unit 31 selects an appropriate one LUT 41 of fixed value data from plural LUTs 41 based on the input image quality mode of the image data 1 (S306). The fixed value data are formed so that synthesized image distinctive data are formed even if the image distinctive image data of the image data 1 and 2 do not exist.

When the input image quality modes of the image data 1 and 2 are the same (NO in S305), the LUT selecting unit 31 selects one LUT 41 of predetermined default fixed value data from plural LUTs 41 (S307). The predetermined default fixed value data are formed so that synthesized image distinctive data are formed even if the image distinctive image data of the image data 1 and 2 do not exist.

Figure 14:
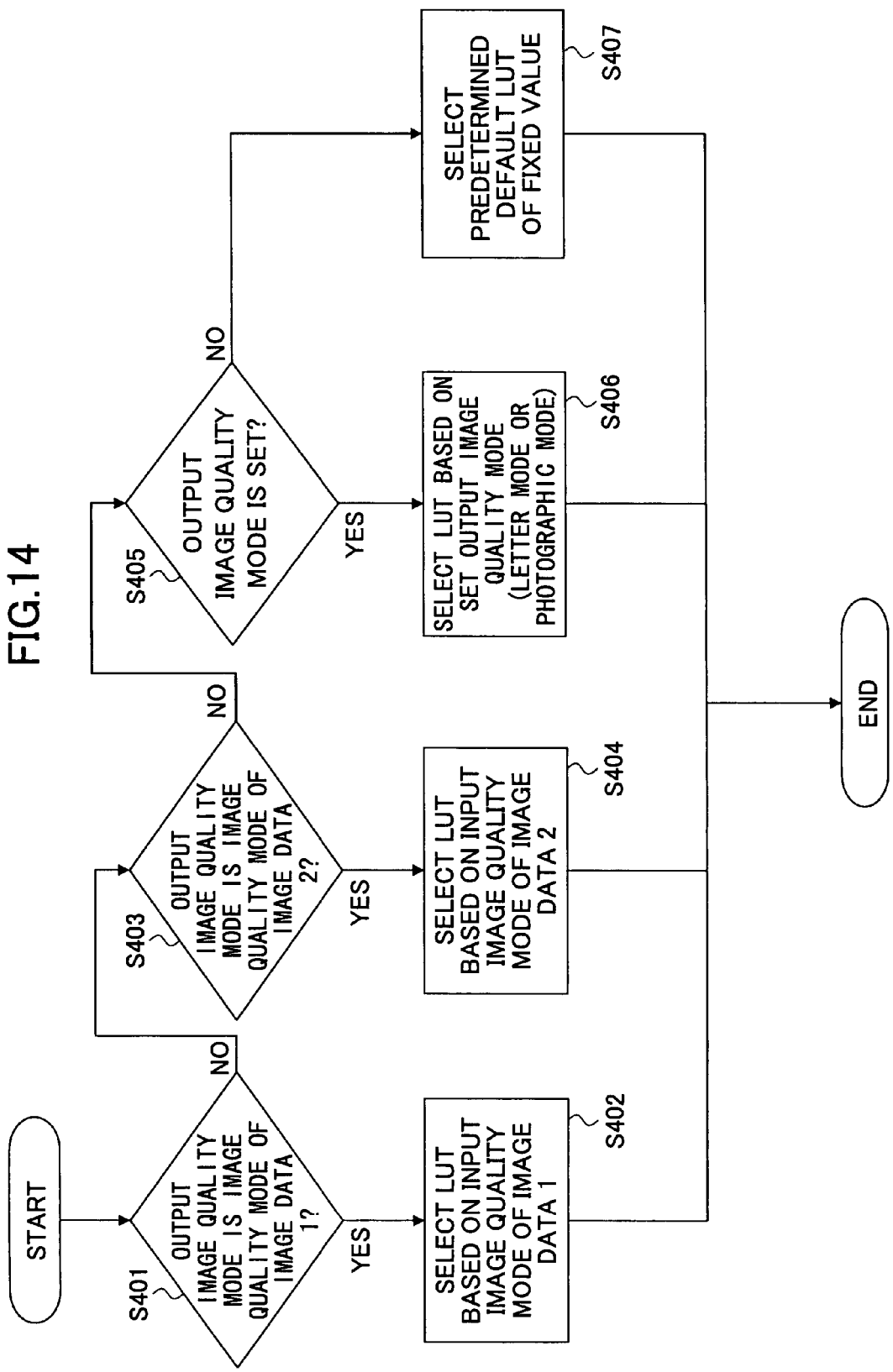
FIG. 14 is a second flowchart showing processes in the LUT selecting unit of the stored data synthesizing section.

FIG. 14 is a second flowchart showing processes in the LUT selecting unit 31 of the stored data synthesizing section 104 in the image processing apparatus 100. In FIG. 14, an output image quality mode is considered.

First, the LUT selecting unit 31 determines whether an output image quality mode, which is input from the key switches of the inputting section 111 and is sent to the printing section 110, is selected as the image quality mode of the image data 1 of the document 1 (S401). As described above, the output image quality modes are, for example, the letter mode, the photographic mode, the image quality mode of the image data 1 of the document 1, and the image quality mode of the image data 2 of the document 2 to be synthesized.

When the output image quality mode is selected as the image quality mode of the image data 1 of the document 1 (YES in S401), the LUT selecting unit 31 selects one LUT 41 from plural LUTs 41 based on the input image quality mode of the image data 1 (S402).

When the output image quality mode is not selected as the image quality mode of the image data 1 of the document 1 (NO in S401), the LUT selecting unit 31 determines whether the output image quality mode is selected as the image quality mode of the image data 2 of the document 2 (S403).

When the output image quality mode is selected as the image quality mode of the image data 2 of the document 2 (YES in S403), the LUT selecting unit 31 selects one LUT 41 from plural LUTs 41 based on the input image quality mode of the image data 2 (S404).

When the Output Image Quality Mode is not selected as the image quality mode of the image data 2 of the document 2 (NO in S403), the LUT selecting unit 31 determines whether the output image quality mode is selected as a mode (for example, the letter mode or the photographic mode) which is not the image quality mode of the image data 1 and the image quality mode of the image data 2 (S405).

When the output image quality mode is selected as a mode, for example, the letter mode or the photographic mode, which is not the image quality mode of the image data 1 and the image quality mode of the image data 2 (YES in S405), the LUT selecting unit 31 selects one LUT 41 from plural LUTs 41 based on the selected output image quality mode, for example, the letter mode or the photographic mode (S406).

When the output image quality mode is not selected as a mode, for example, the letter mode or the photographic mode, which is not the image quality mode of the image data 1 and the image quality mode of the image data 2 (NO in S405), the LUT selecting unit 31 selects one LUT 41 of fixed value data from plural LUTs 41 based on a predetermined default output image quality mode (S407).

Next, referring to FIGS. 1 and 15 through 22, operations of the LUT selecting unit 31 are described in which one LUT 41 is selected from plural LUTs 41 based on a combination of the presence of the image distinctive data, the input image quality mode, and the output image quality mode.

Figure 15:
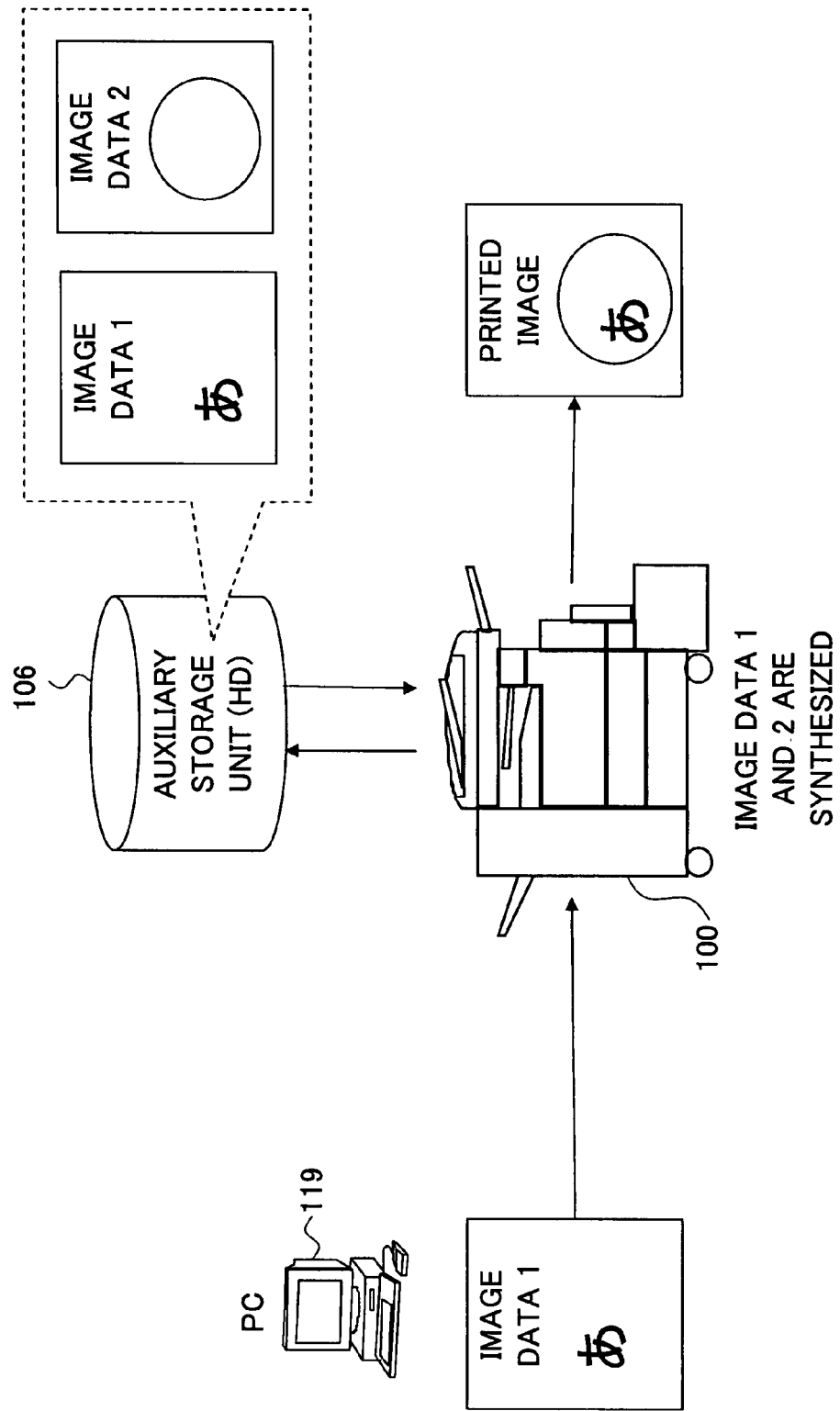
FIG. 15 is a diagram showing operations in which image data input from an external device via an external device I/F are synthesized with image data stored in an auxiliary storage unit shown in FIG. 1.

FIG. 15 is a diagram showing operations in which image data input from the external device 119 (PC) via the external device I/F 114 are synthesized with image data stored in the auxiliary storage unit 106.

[External Data Storing Operations]

Referring to FIGS. 1, 15 and 16, operations are described in which image data input from the external device 119 (PC) via the external device I/F 114 are stored in the auxiliary storage unit 106.

A user of the external device 119 (PC) transmits an electronic document as electronic data to the image processing apparatus 100 via a printer driver (not shown) by using application software. The printer driver converts the contents of the electronic document into electronic data which a PDL (page description language) such as PCL and PostSript in the image processing apparatus 100 can interpret. The converted data (print data) are transmitted from the external device 119 (PC) to the image processing apparatus 100 via a data transmission line such as a network and a USB.

The controller 107 makes the PDL interpret the print data received via the external device I/F 114 and applies a rendering process to the print data in the memory 108. In the present embodiment, mapping is applied to the print data in a color space standardized into RGB data of 8 bits per pixel and image distinctive data of the print data are generated. That is, an image region separating process and a region converting process are applied to the print data (image data) to which the rendering process is applied.

One pixel of the image distinctive data is formed of 2 bits. FIG. 16 is a table showing a bit definition of the image distinctive data which are used for image data input via the external device I/F 114.

As shown in FIG. 16, in two bits (b1, b0), information is defined in the bit "b1" in which the image distinctive data are an image or a non-image, and information is defined in the bit "b0" in which the image distinctive data are a white background or a non-white background. By combinations of the information in the two bits (b1, b0), the image distinctive data in the image region which are needed by the stored data processing section 105 can be expressed by four patterns of "image with white background", "non-image with white background", "image with non-white background", and "non-image with non-white background".

The image region separating process and the region converting process are applied to the image data (RGB data) to which the rendering process is applied and the image distinctive data (2 bits) are generated. The image data stored in the memory 108 by having applied the rendering process and the generated image distinctive data are stored in the auxiliary storage unit 106 via the controller 107 and the bus controller 103.

In FIG. 15, the synthesizing and printing operations of the image data 1 and 2 stored in the auxiliary storage unit 106 are shown. The image data 1 are transmitted from the external device 119 and stored in the auxiliary storage unit 106. The image data 1 have a circle and the image data 2 have a Japanese phonetic script "あ". When the image data 1 and 2 are synthesized and printed on a sheet, the printed image is shown at the lower right side of FIG. 15. In FIG. 15, the auxiliary storage unit 106 is separated from the image processing apparatus 100; however, actually, the auxiliary storage unit 106 is included in the image processing apparatus 100.

[Stored Image Data Synthesizing and Printing Operations]

Referring to FIGS. 1 and 17, the operations are described in which the image data stored in the auxiliary storage unit 106 are synthesized and the synthesized image data are printed on a sheet by the printing section 110.

First, a user sets an output image quality mode for the image data 1 and 2 including the image distinctive data stored in the auxiliary storage unit 106 and inputs an instruction starting to synthesize the image data and print the synthesized image data via the key switches of the inputting section 111 and/or the displaying section 112. As described above, the output image quality mode is the letter mode, the photographic mode, the image quality mode of the image data 1 of the document 1, or the image quality mode of the image data 2 of the document 2 to be synthesized.

The inputting section 111 converts the information input by the user via the key switches into control command data in the image processing apparatus 100 and issues the control command data. The issued control command data are input to the controller 107 via the PCI Express bus.

The controller 107 executes a program of image data synthesizing and printing operations based on the control command data which execute the image data synthesizing and printing operations. The program sequentially executes settings and processes necessary for the image data synthesizing and printing operations. In the present embodiment, the LUT selecting unit 31 selects an LUT 41 shown in FIG. 17.

FIG. 17 is a second LUT 41 in the image processing apparatus 100.

Data in the hatched part of the second LUT 41 shown in FIG. 17 are different from the data in the part of the first LUT 41 shown in FIG. 10. When the combination is that the image distinctive data of the image data 1 are "non-image and non-white background" and the image distinctive data of the image data 2 are "image and white background", the stored data processing section 105 applies the optimum image processes (the filtering process and the color conversion process) to the image data so that reproducibility of the chromatic letter is increased by the synthesized image distinctive data of the hatched part at the letter region of the image data 1, which are synthesized on the white background (achromatic non-letter) of the image data 2.

As described above, the controller 107 determined whether the image data are input from the document reading section 101 or input via the external device I/F 114 based on the presence of the image distinctive data of the input image data 1 and 2 in the combination of the image data 1 and 2 to be synthesized. Then since the controller 107 can change the LUT 41 by the input section of the image data, the controller 107 can select an appropriate one LUT 41 from plural LUTs 41. Therefore, the synthesized image distinctive data appropriate to the optimum image processes for generating synthesized image data which the user desires to obtain can be realized.

Figure 18:
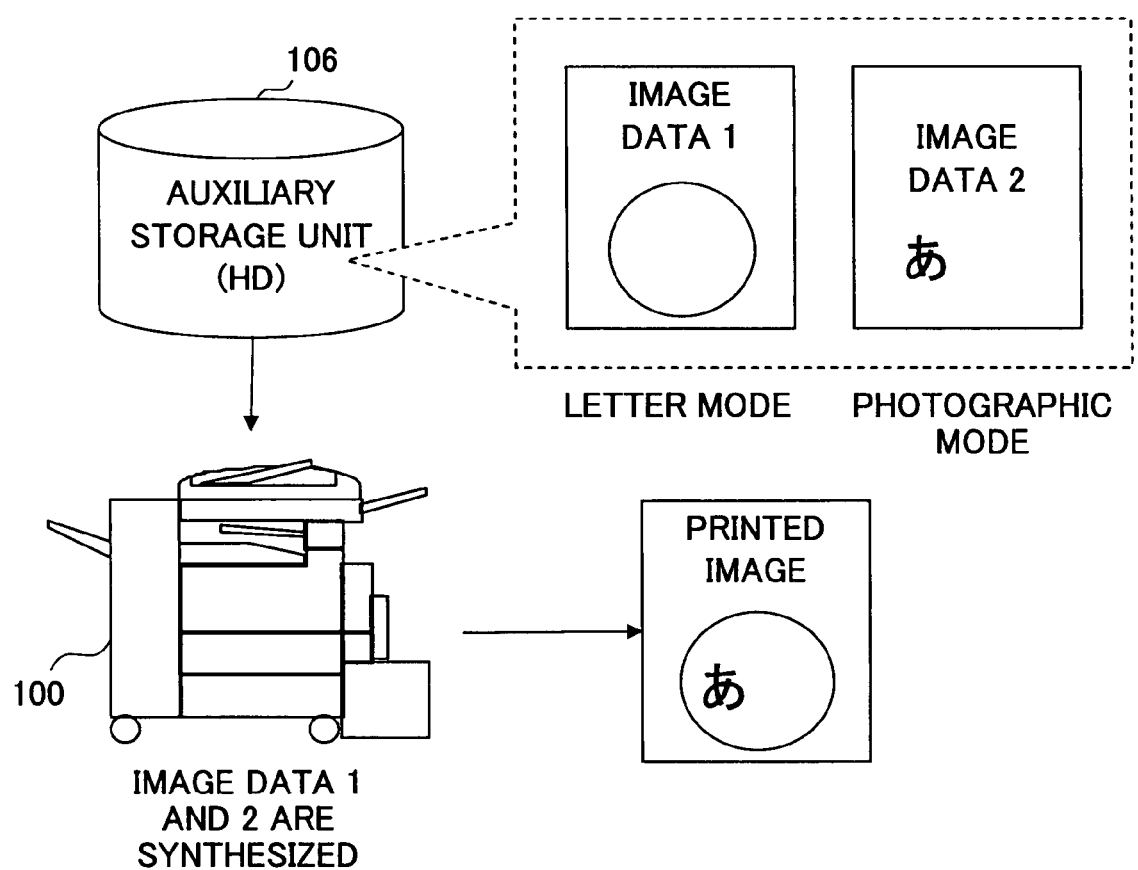
FIG. 18 is a diagram showing operations in the image processing apparatus in which two image data items having corresponding different input image modes stored in the auxiliary storage unit are synthesized.

FIG. 18 is a diagram showing operations in the image processing apparatus 100 in which two image data items having corresponding different input image modes stored in the auxiliary storage unit 106 are synthesized. In FIG. 18, the auxiliary storage unit 106 is separated from the image processing apparatus 100; however, actually, the auxiliary storage unit 106 is included in the image processing apparatus 100.

[Image Data Storing Operations in Auxiliary Storage Unit]

First, a user puts a document on a document reading surface (contact glass) of the document reading section 101, and selects an input image quality mode, for example, a letter mode or a photographic mode, and makes the image processing apparatus 100 start copying the document by using key switches on the inputting section 111 and/or the displaying section 112.

As described above in FIGS. 1 through 3, the controller 107 makes the image data correcting section 102 correct the input image data and stores the corrected image data and the image distinctive data in the memory 108 via the bus controller 103. The image data and the image distinctive data stored in the memory 108 are stored in the auxiliary storage unit 106 via the controller 107 and the bus controller 103.

As shown in FIG. 18, in the operations, the input image quality mode selected by the user is the letter mode for the image data 1 and the photographic mode for the image data 2, and the document reading section 101 reads the image data 1 and 2.

As described in FIG. 5, the controller 107 stores the input image quality mode in the bibliographic information area 21 of the image data file 20 in the auxiliary storage unit 106.

[Stored Image Data Synthesizing and Printing Operations]

The image data 1 and 2 stored in the auxiliary storage unit 106 are synthesized and the synthesized image data are printed by the printing section 110.

The user selects output image quality modes for the image data 1 and 2 including the image distinctive data stored in the auxiliary storage unit 106 and instructs the image processing apparatus 100 to print the synthesized image data by using the key switches (user interface) of the inputting section 111 and/or the displaying section 112. The output image quality mode is the letter mode, the photographic mode, the output image quality mode of the image data 1, or the output image quality mode of the image data 2.

The inputting section 111 converts the information input via the key switches into control command data in the image processing apparatus 100 and issues the control command data. The issued control command data are sent to the controller 107 via the PCI Express bus.

The controller 107 executes a program of the image data synthesizing and printing operations and sequentially executes settings and processes necessary for the operations based on the control command data which instructs printing the synthesized image data.

In this case, the LUT selecting unit 31 selects an LUT 41 shown in FIG. 19.

FIG. 19 is a third LUT 41 in the image processing apparatus 100.

Data in the hatched part of the third LUP 41 shown in FIG. 19 are different from the data in the part shown in FIG. 10. As shown in FIG. 18, in the image data 2, since the photographic mode is selected as the input image quality mode, it can be considered that the image data 2 are formed of a photographic document. Therefore, a pixel whose "b1" bit information is determined as "1" (letter) can be estimated as an edge part of the photographic document in the image distinctive data extracted by the image region separation process and the region converting process by the image data correcting section 102. Accordingly, the synthesized image distinctive data in this combination are changed to the data of the hatched part.

With this, the optimum image processes (the filtering process and the color conversion process) are applied to the letter regions of the image data 1 and the image data 2 formed of the photographic document to be synthesized by the stored data processing section 105, and the reproducibility of the letter can be increased. In the combination of image data 1 and 2 to be synthesized, even if the input image quality modes of the image data 1 and 2 are different from each other when the image data 1 and 2 are read by the document reading section 101, the LUT 41 can be selected, that is, the LUT 41 can be changed when the input image quality modes of the image data 1 and 2 are different from each other, and synthesized image data which the user desires to obtain can be realized.

In FIG. 18, the synthesizing and printing operations of the image data 1 and 2 stored in the auxiliary storage unit 106 are shown. The image data 1 have a circle of the letter mode and the image data 2 have a Japanese phonetic script "あ" of the photographic mode. When the image data 1 and 2 are synthesized and printed on a sheet, the printed image is shown at the lower right side of FIG. 18. In FIG. 18, the auxiliary storage unit 106 is separated from the image processing apparatus 100; however, actually, the auxiliary storage unit 106 is included in the image processing apparatus 100.

[Image Data Storing Operations in Auxiliary Storage Unit]

Figure 20:
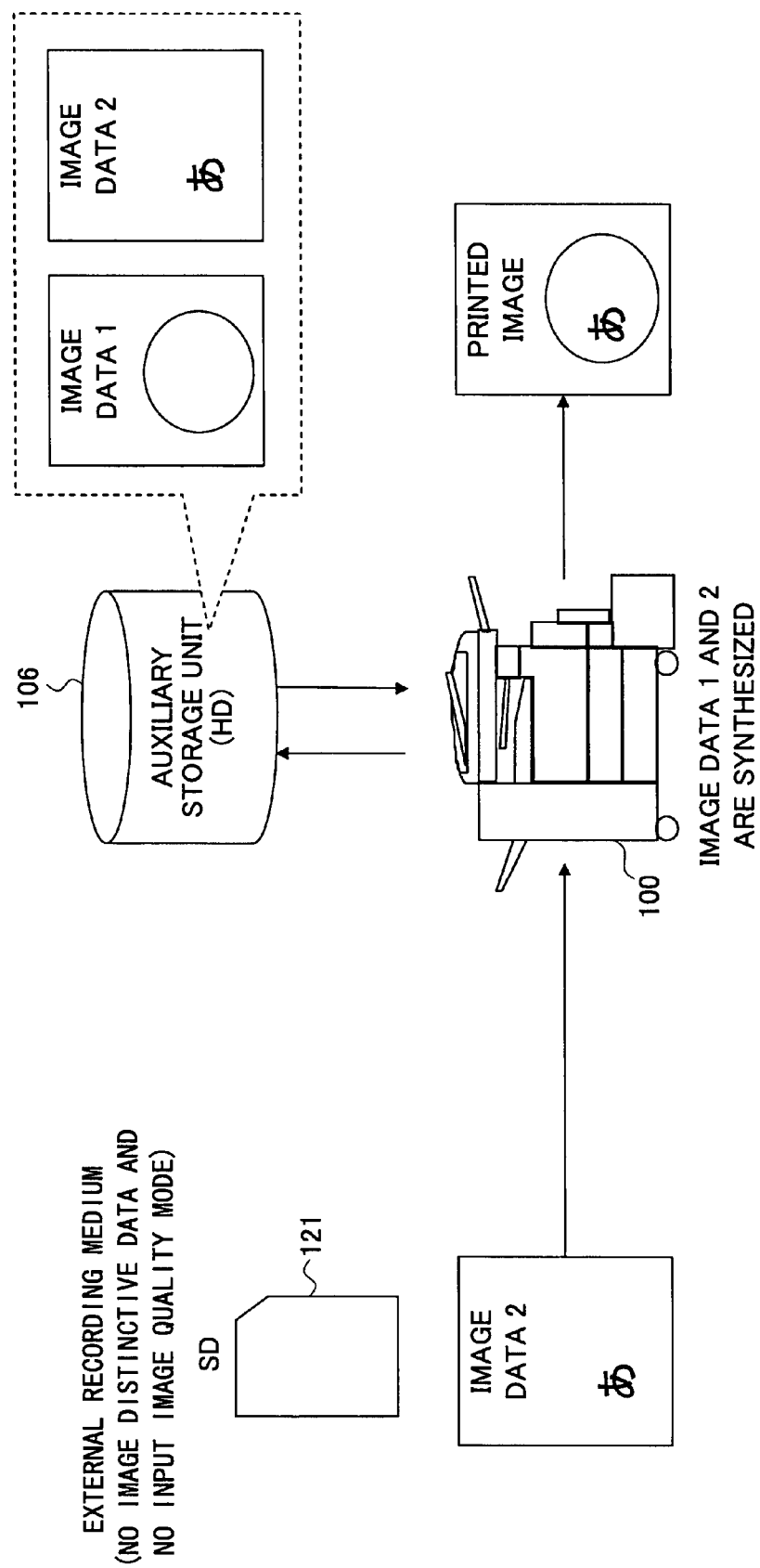
FIG. 20 is a diagram showing operations in which image data input from an external recording medium and image data stored in the auxiliary storage unit are synthesized and the synthesized image data are printed.

FIG. 20 is a diagram showing operations in which image data input from the external recording medium 121 and image data stored in the auxiliary storage unit 106 are synthesized and the synthesized image data are printed.

First, a user connects an external recording medium 121 (for example, an SD memory card) to the external recording media drive 120. The controller 107 obtains image data 2 stored in the external recording medium 121 via a data transmission route which connects the external recording media drive 120 with the external recording media I/F 115, and stores the obtained image data 2 in the auxiliary storage unit 106 via the bus controller 103.

[Stored Image Data Synthesizing and Printing Operations]

The image data 1 and the image data 2 obtained from the external recording medium 121, stored in the auxiliary storage unit 106, are synthesized and the synthesized image data are printed by the printing section 110.

The user selects an output image quality mode for the image data 1 and 2 stored in the auxiliary storage unit 106 and instructs the image processing apparatus 100 to print the synthesized image data by using the key switches (user interface) of the inputting section 111 and/or the displaying section 112. The output image quality mode is the letter mode, the photographic mode, the image quality mode of the image data 1, or the image quality mode of the image data 2.

The inputting section 111 converts the information input via the key switches into control command data in the image processing apparatus 100 and issues the control command data. The issued control command data are sent to the controller 107 via the PCI Express bus.

The controller 107 executes a program of the image data synthesizing and printing operations and sequentially executes settings and processes necessary for the operations based on the control command data which instructs printing the synthesized image data. In this case, the LUT selecting unit 31 selects an LUT 41 shown in FIG. 21.

FIG. 21 is a fourth LUT 41 in the image processing apparatus 100.

As shown in the hatched part of FIG. 21, data in the fourth LUT 41 are fixed as a unique value "b1=0, b0=1: chromatic non-letter". Since the image data 2 are recorded in the external recording medium 121 by, for example, a digital camera, the image region separation process and the region converting process in the image data correcting section 102 are not applied to the image data 2, and image distinctive data do not exist for the image data 2. That is, the image data 2 do not have the reference address data (the image distinctive data) for generating the synthesized image distinctive data. In order to generate synthesized image data from the image data 1 and the image data 2 obtained from the external recording medium 121, the LUT 41 shown in FIG. 21 is provided.

With this, the optimum image processes (the filtering process and the color conversion process) are applied to the image data 1 and the image data 2 by the stored data processing section 105, and the reproducibility of the image data 2, for example, the photographic data, recorded on the external recording medium 121 can be increased.

In the combination of image data 1 and 2 to be synthesized, even if the image data 2, from which image distinctive data cannot be extracted, are synthesized with the image data 1, the LUT 41 can be selected. That is, the LUT 41 can be changed when the image data 2, from which image distinctive data cannot be extracted, are synthesized with the image data 1, and synthesized image data which the user desires to obtain can be realized.

In FIG. 20, the synthesizing and printing operations of the image data 1 and 2 stored in the auxiliary storage unit 106 are shown. The image data 2 are transmitted from the external recording medium 121 and are stored in the auxiliary storage unit 106. The image data 1 have a circle and the image data 2 have a Japanese phonetic script "あ" input from the external recording medium 121. When the image data 1 and 2 are synthesized and printed on a sheet, the printed image is shown at the lower right side of FIG. 20. In FIG. 20, the auxiliary storage unit 106 is separated from the image processing apparatus 100; however, actually, the auxiliary storage unit 106 is included in the image processing apparatus 100.

[Image Data Storing Operations in Auxiliary Storage Unit]

Figure 22:
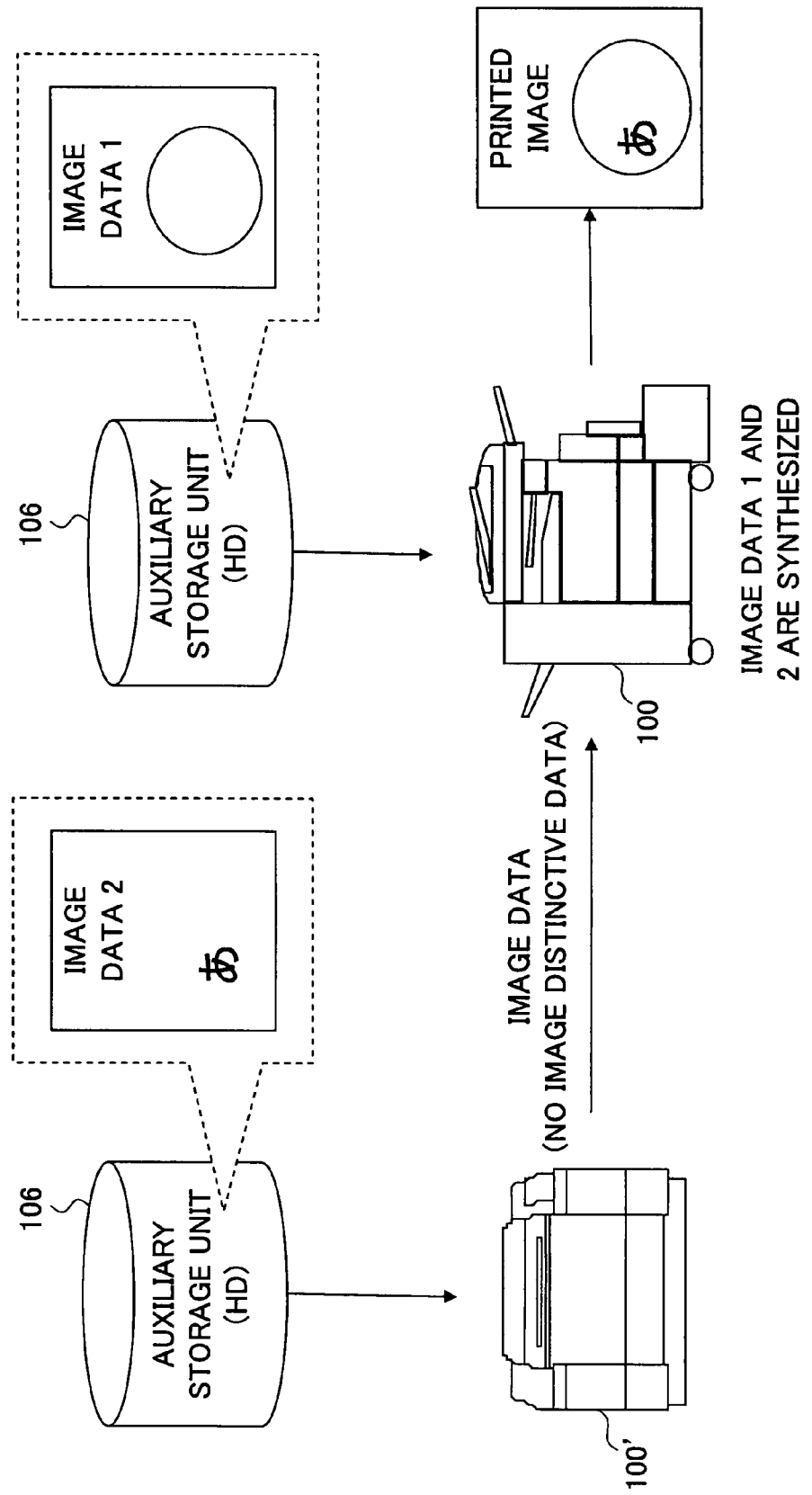
FIG. 22 is a diagram showing operations in which image data input from another image processing apparatus and image data stored in the auxiliary storage unit of the image processing apparatus are synthesized and the synthesized image data are printed.

FIG. 22 is a diagram showing operations in which image data input from another image processing apparatus and image data stored in the auxiliary storage unit 106 of the image processing apparatus 100 are synthesized and the synthesized image data are printed.

First, a user obtains image data 2 stored in an auxiliary storage unit 106 of an image processing apparatus 100' connected to the image processing apparatus 100 via the external device I/F 114 by operating the key witches of the inputting section 111 and/or the displaying section 112 of the image processing apparatus 100. The controller 107 stores the obtained image data 2 in the auxiliary storage unit 106 of the image processing apparatus 100 via the bus controller 103. In the auxiliary storage unit 106 of the image processing apparatus 100, image data 1 have been stored. In FIG. 22, the image data 2 stored in the auxiliary storage unit 106 of the image processing apparatus 100 are not shown.

[Stored Image Data Synthesizing and Printing Operations]

The image data 1 and the image data 2 obtained from the image processing apparatus 100', stored in the auxiliary storage unit 106, are synthesized and the synthesized image data are printed by the printing section 110.

The user selects an output image quality mode for the image data 1 and 2 stored in the auxiliary storage unit 106 and instructs the image processing apparatus 100 to print the synthesized image data by using the key switches (user interface) of the inputting section 111 and/or the displaying section 112. The output image quality mode is the letter mode, the photographic mode, the image quality mode of the image data 1, or the image quality mode of the image data 2.

The inputting section 111 converts the information input via the key switches into control command data in the image processing apparatus 100 and issues the control command data. The issued control command data are sent to the controller 107 via the PCI Express bus.

The controller 107 executes a program of the image data synthesizing and printing operations and sequentially executes settings and processes necessary for the operations based on the control command data which instructs printing the synthesized image data. In this case, the LUT selecting unit 31 selects an LUT 41 shown in FIG. 23.

FIG. 23 is a fifth LUT 41 in the image processing apparatus 100.

As shown in the hatched part of FIG. 23, data in the LUT 41 are fixed as a unique value "b1=1, b0=0: achromatic letter". The image data 2 are obtained from the image processing apparatus 100'. The image processing apparatus 100' does not have, for example, an image region separation function and an image region conversion function, and the image data 2 stored in the auxiliary storage unit 106 of the image processing apparatus 100' are the RGB data which do not have the image distinctive data. That is, the image processing apparatus 100' may be a low cost version apparatus, and settings of an input image quality mode (for example, the letter mode or the photographic mode) may be different from the settings in the image processing apparatus 100. Since in many cases, the image data 2 are formed of an electronic document including letters, in the combination of the image data 1 and 2, the image data 2 do not have the image distinctive data. Therefore, by considering that both of the image data 1 and 2 have the input image mode, an LUT 41 shown in FIG. 23 is provided.

With this, the optimum image processes (the filtering process and the color conversion process) are applied to the image data 1 and the image data 2 by the stored data processing section 105, and the reproducibility of a letter input from the image processing apparatus 100' can be increased.

In the combination of image data 1 and 2 to be synthesized, even if the image data 2, from which image distinctive data cannot be extracted, are synthesized with the image data 1, the LUT 41 shown in FIG. 23 can be selected, that is, the LUT 41 can be changed when the image data 2, from which image distinctive data cannot be extracted, are synthesized with the image data 1, and synthesized image data which the user desires to obtain can be realized.

In FIG. 22, the synthesizing and printing operations of the image data 1 and 2 stored in the corresponding auxiliary storage units 106 are shown. The image data 1 have a circle and the image data 2 have a Japanese phonetic script "あ" inputted from the image processing apparatus 100'. When the image data 1 and 2 are synthesized and printed on a sheet, the printed image is shown at the lower right side of FIG. 22. In FIG. 22, the auxiliary storage units 106 are shown separated from the corresponding image processing apparatuses 100 and 100'; however, the auxiliary storage units 106 are actually included in the corresponding image processing apparatuses 100 and 100'.

Second Embodiment

Next, referring to the drawings, a second embodiment of the present invention is described.

Figure 24:
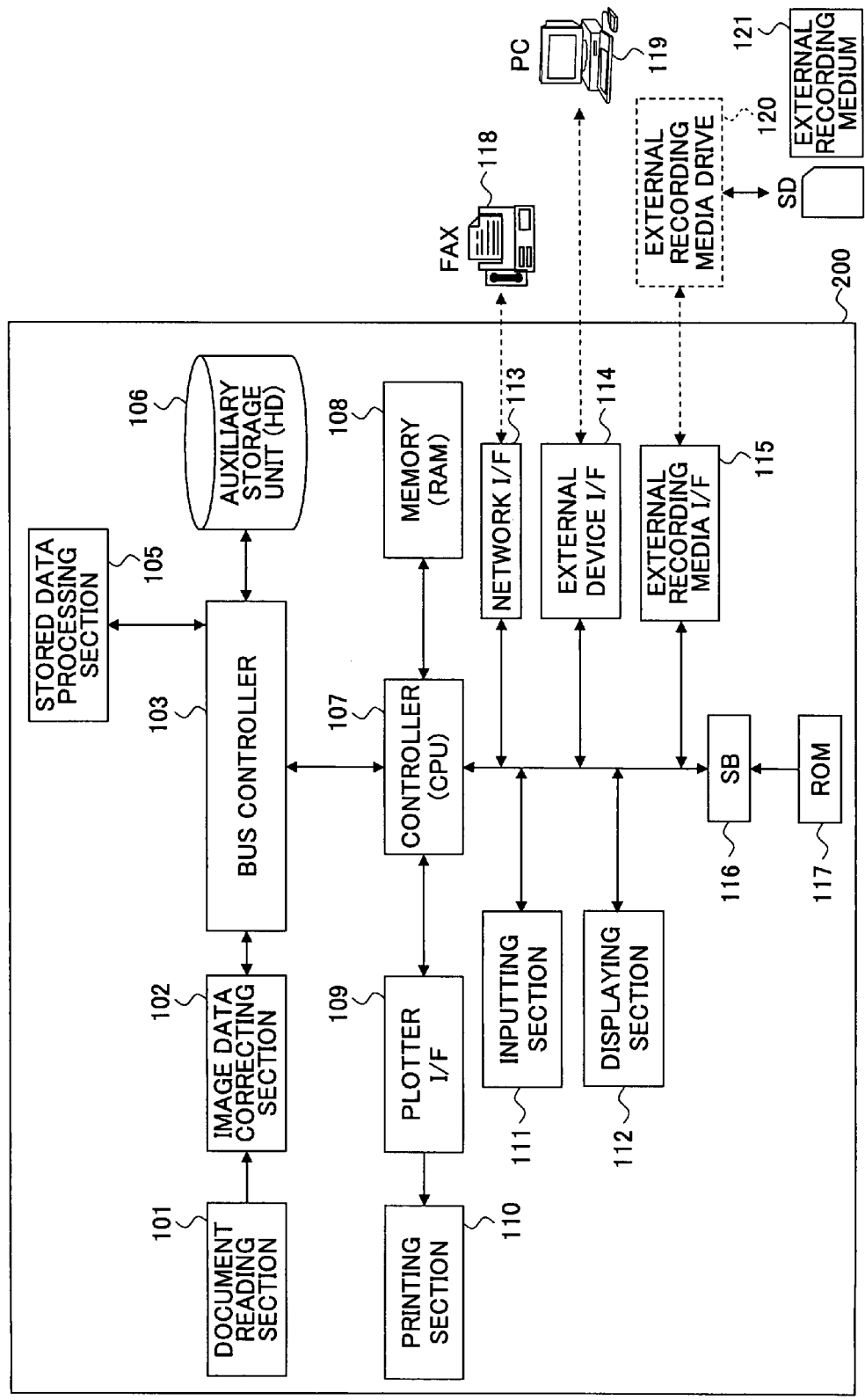
FIG. 24 is a block diagram showing an image processing apparatus according to a second embodiment of the present invention.

FIG. 24 is a block diagram showing an image processing apparatus 200 according to a second embodiment of the present invention.

As shown in FIG. 24, the image processing apparatus 200 does not include the stored data synthesizing section 104 which the image processing apparatus 100 in the first embodiment of the present invention includes. That is, in the second embodiment of the present invention, the controller 107 in the image processing apparatus 200 executes the operations of the stored data synthesizing section 104 in the first embodiment of the present invention by using a program.

In the first embodiment of the present invention, the stored data synthesizing section 104 is formed of an ASIC, and as shown in FIG. 8, and the image data synthesizing section 1041 in the stored data synthesizing section 104 includes the image data synthesizing unit 33. The image data synthesizing unit 33 synthesizes the image data 1 and 2 stored in the memory 108 sent from the auxiliary storage unit 106 via the bus controller 103 and the controller 107.

The image data synthesizing unit 33 compares the sizes of the RGB values (0 to 255) of pixels corresponding to the pixel array (x, y) in the image data 1 and 2, synthesizes the image data by determining a larger pixel value as a synthesized pixel value (calculate with black (0,0,0) as FFH (0x1111111) in 8-bit and 256 tones), and sends the synthesized image data 3 to the stored data processing section 105 via the bus controller 103.

In the second embodiment of the present invention, the controller 107 executes the above described image data synthesizing operations by using a program. The controller 107 applies the above synthesizing operations to the image data 1 and 2 stored in the memory 108 and sends the synthesized image data 3 to the stored data processing section 105.

Figure 25:
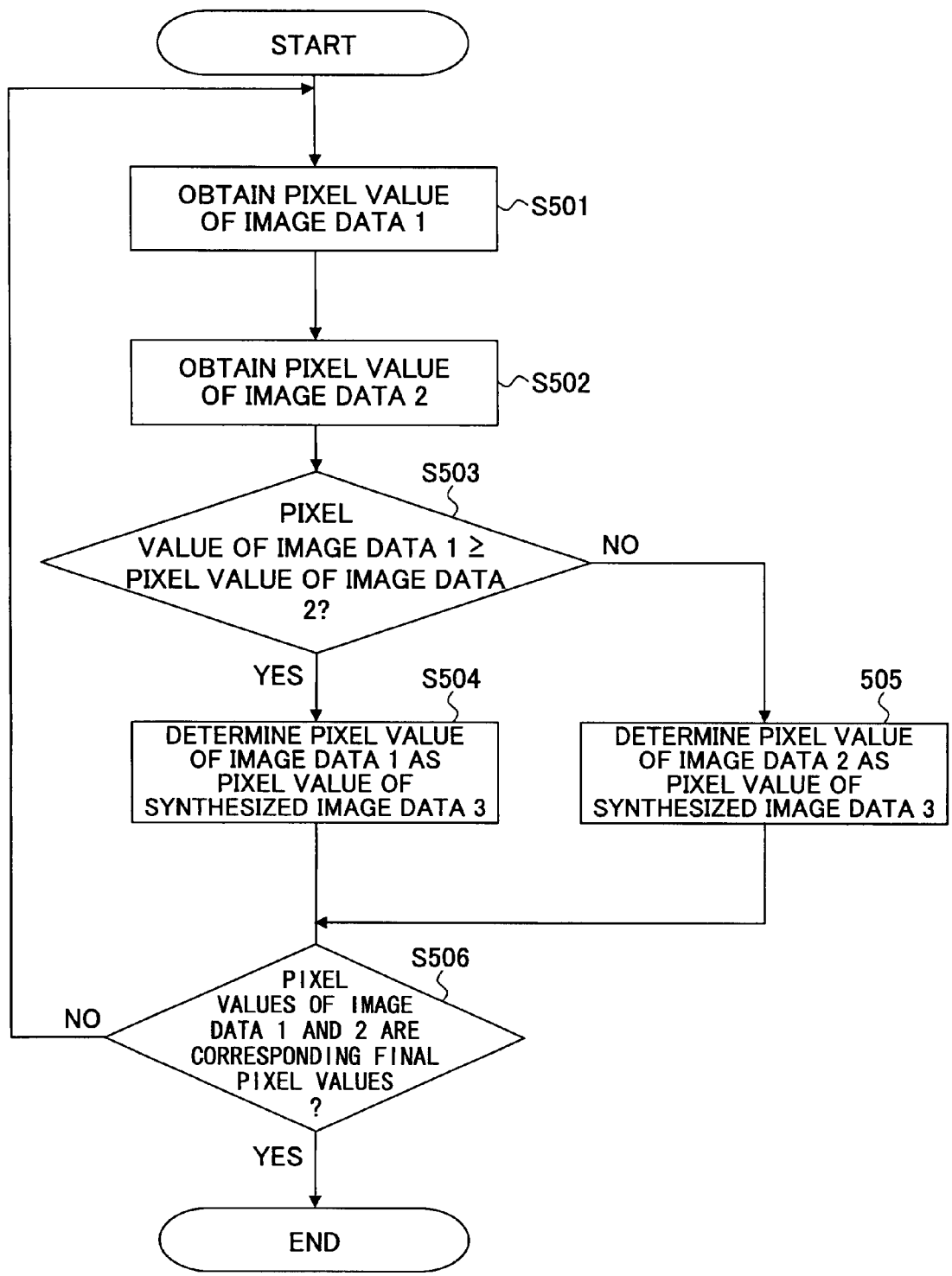
FIG. 25 is a flowchart showing image data synthesizing processes in the image data synthesizing unit in the image processing apparatus according to the second embodiment of the present invention.

FIG. 25 is a flowchart showing image data synthesizing processes in the image data synthesizing unit 33 in the image processing apparatus 200.

Referring to FIG. 25, the processes similar to the image data synthesizing unit 33 are described.

First, the controller 107 obtains a pixel value (RGB value: 0 to 255) of the image data 1 stored in the memory 108 (S501), and obtains a pixel value (RGB value: 0 to 255) of the image data 2 stored in the memory 108 (S502).

Next, the controller 107 determines whether the pixel value of the image data 1 is equal to or more than the pixel value of the image data 2 (S503).

When the pixel value of the image data 1 is equal to or more than the pixel value of the image data 2 (YES in S503), the controller 107 determines that the pixel value of the image data 1 is the pixel value of the synthesized image data 3 (S504).

When the pixel value of the image data 1 is less than the pixel value of the image data 2 (NO in S503), the controller 107 determines that the pixel value of the image data 2 is the pixel value of the synthesized image data 3 (S505).

Then the controller 107 determines whether the pixel value of the image data 1 and the pixel value of the image data 2 are the corresponding final pixel values (S506).

When the pixel value of the image data 1 and the pixel value of the image data 2 are not the corresponding final pixel values (NO in S506), the process is returned to the process in S501 and the processes from S501 to S506 are repeated.

When the pixel value of the image data 1 and the pixel value of the image data 2 are the corresponding final pixel values (YES in S506), the processes end.

In the first embodiment of the present invention, as shown in FIG. 8, the synthesized image distinctive data generating section 1042 includes the synthesized image distinctive data generating unit 32. The synthesized image distinctive data generating unit 32 generates the synthesized image distinctive data 3 by referring to the LUT 41 selected by the LUT selecting unit 31.

In the second embodiment of the present invention, the controller 107 executes the image data synthesizing processes by executing a program. That is, the controller 107 executes the image data synthesizing processes by referring to an LUT 41 stored in the memory 108, and sends the generated synthesized image distinctive data 3 to the stored data processing section 105.

Figure 26:
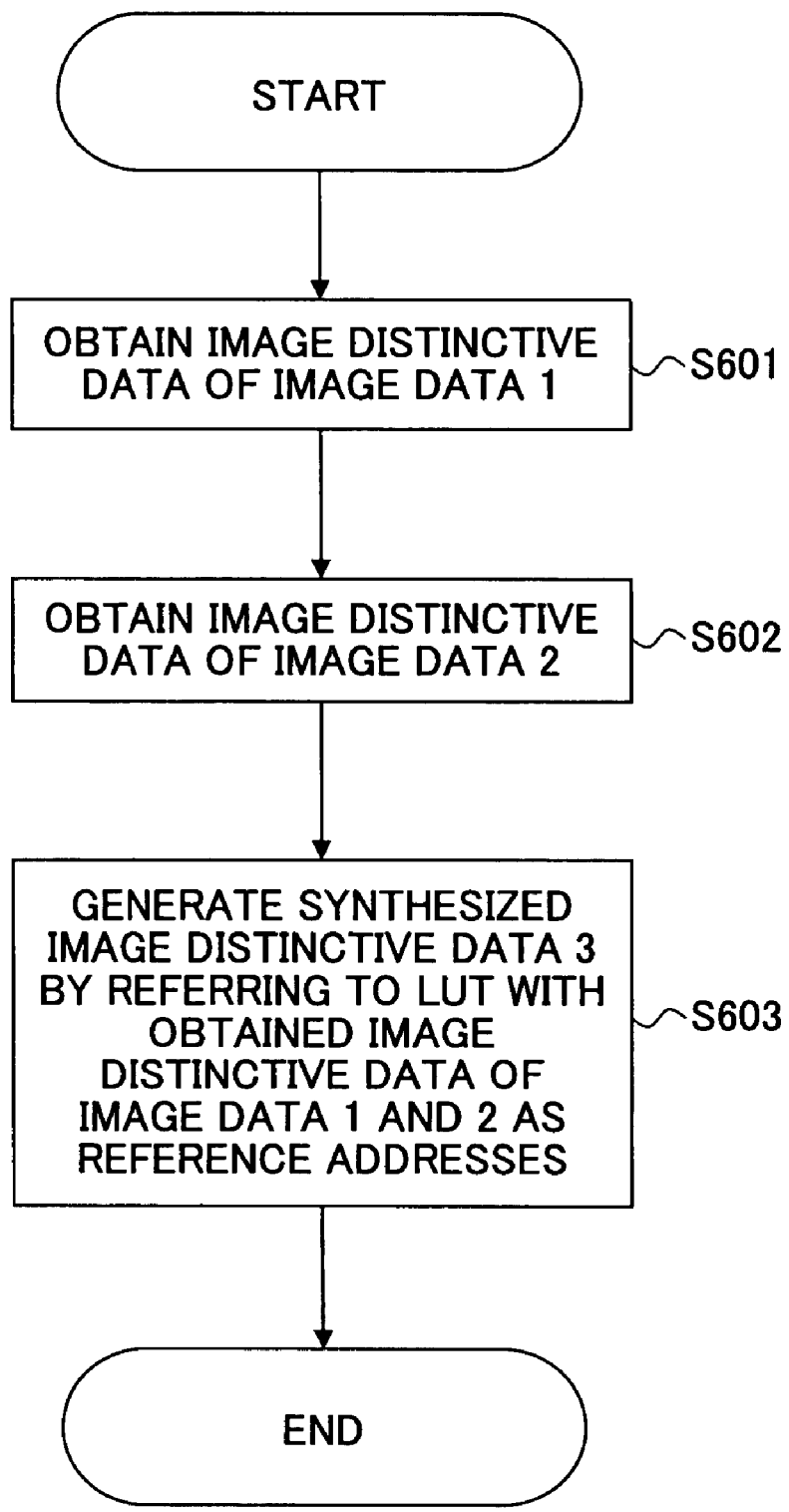
FIG. 26 is a flowchart showing image distinctive data synthesizing processes by a controller in the image processing apparatus according to the second embodiment of the present invention.

FIG. 26 is a flowchart showing image distinctive data synthesizing processes by the controller in the image processing apparatus 200.

Referring to FIG. 26, the image distinctive data synthesizing processes by the controller 107 are described.

First, the controller 107 obtains image distinctive data of the image data 1 stored in the memory 108 (S601), and obtains image distinctive data of the image data 2 stored in the memory 108 (S602).

The controller 107 generates synthesized image distinctive data by setting the image distinctive data of the image data 1 and 2 as reference addresses and by referring to an LUT 41 selected by the controller 107 (S603).

As described above, in the second embodiment of the present invention, the same effect as in the first embodiment of the present invention can be obtained.

As described above, according to the first embodiment of the present invention, the image data synthesizing unit 33 synthesizes the image data 1 and 2 stored in the auxiliary storage unit 106, the LUT selecting unit 31 selects an appropriate one LUT 41, and the synthesized image distinctive data generating unit 32 generates the synthesized image distinctive data 3 by referring to the selected LUT 41. The stored data processing section 105 applies the optimum image processes (the filtering process and the color conversion process) to the image data 1 and 2 based on the generated synthesized image distinctive data 3. With this, the reproducibility of the image data 1 and 2 can be increased by effectively generating the synthesized image data 3.

As described above, the above processes are executed by a program in each of the image processing apparatuses 100 and 200.

In the first and second embodiments of the present invention, as the external recording medium 121, the SD memory card is used. However, the external recording medium 121 is not limited to the SD memory card, and the external recording medium 121 can be a memory card, for example, a CF (CompactFlash) card, a SmartMedia card, a Memorystick, an MMC (MultiMedia card), an xD-Picture Card, or an externally connected HD. In addition, the external recording medium 121 can be a CD (Compact Disk), a DVD (Digital Versatile Disk), an MO (Magneto-Optical) disk, or a floppy disk. That is, the external recording medium 121 can be a recording medium whose recorded image data are read by the external recording media drive 120 connected to the external recording media I/F 115.

In addition, the plural LUTs 41 are provided by considering combinations of the input image quality modes and the output image quality modes and the image distinctive data of the image data 1 and 2. The input image quality mode is, for example, the letter mode or the photographic mode. The output image quality mode is, for example, the letter mode, the photographic mode, the image mode of the image data 1, or the image mode of the image data 2. However, the structure of the LUT 41 is not limited to the above structure.

That is, an LUT 41 can be provided by depending on the use situation and the use application of the image processing apparatus 100 (200) and/or matching the using image data and the needs of the user. Further, the contents and the number of the LUTs 41 are not limited to those described above. In addition, the LUTs 41 can be customized.

In addition, in the second embodiment of the present invention, when the controller 107 executes programs in the image processing apparatus 200, the processes in the synthesized image distinctive data generating unit 32 and the image data synthesizing unit 33 in the first embodiment of the present invention are realized. In addition, a program can realize other processes in the image processing apparatus 200.

For example, when the controller 107 executes programs, processes in the image data correcting section 102 and the stored image processing section 105 can be realized.

Especially, since the low cost type image processing apparatus 100' cannot includes an ASIC, when the controller 107 executes a program, processes in the image data correcting section 102 and/or the stored image processing section 105 can be realized. However, when an excessive load is applied to the image processing apparatus 200 by realizing the above functions by executing a program, the performance of the image processing apparatus 200 may be lowered. Therefore, the program should be executed without lowering the performance of the image processing apparatus 200.

Further, the present invention is not limited to the specifically disclosed embodiments, and variations and modifications may be made without departing from the scope of the present invention.

The present invention is based on Japanese Priority Patent Application No. 2006-240750, filed on Sep. 5, 2006, with the Japanese Patent Office, the entire contents of which are hereby incorporated herein by reference.

What is claimed is:

1. An image processing apparatus, comprising:
    a document reading unit which reads image data of a document;
    an image distinctive data generating unit which generates image distinctive data of the image data read by the document reading unit;
    an image data receiving unit which receives image data input from an external device;
    an image data storing unit which stores the image data read by the document reading unit, the image distinctive data generated by the image distinctive data generating unit, and the image data received from the external device;

an image data synthesizing unit which synthesizes first image data and second image data stored in the image data storing unit, and synthesizes first image distinctive data from the first image data and second image distinctive data from the second image data; and an image data processing unit which applies a specific process amongst a plurality of predetermined processes to the synthesized image data of the first image data and the second image data, wherein the specific process applied to the synthesized image data is determined based on synthesized image distinctive data from synthesis of (i) the first image distinctive data and (ii) the second image distinctive data.

2. The image processing apparatus as claimed in claim 1, wherein the image data synthesizing unit includes a synthesized image distinctive data generating rule selecting unit which selects a synthesized image distinctive data generating rule from a plurality of the synthesized image distinctive data generating rules based on at least one of information in which presence of the first image distinctive data and the second image distinctive data is described;

information in which input image quality modes of the first image data and the second image data are described; and information in which output image quality modes of the first image data and the second image data are described; and wherein the image data synthesizing unit generates the synthesized image distinctive data of the first and second image distinctive data based on the synthesized image distinctive data generating rule selected by the synthesized image distinctive data generating rule selecting unit.

3. The image processing apparatus as claimed in claim 1, wherein:

the first image data and the second image data are read by the document reading unit.

4. The image processing apparatus as claimed in claim 1, wherein:

the first image data are read by the document reading unit and the second image data are received from the external device by the image data receiving unit.

5. The image processing apparatus as claimed in claim 4, wherein:

the image data receiving unit is connected to a telephone line or a network, and the external device is a facsimile machine connected to the telephone line, a computer connected to the network, another image processing apparatus connected to the network, or an external recording medium connected to the network.

6. The image processing apparatus as claimed in claim 1, wherein:

the image synthesizing unit is formed of an ASIC (application specific integrated circuit).

7. An image processing method in an image processing apparatus, comprising the steps of:

reading image data of a document;

generating image distinctive data of the read image data;

receiving image data input from an external device;

storing the read image data, the generated image distinctive data, and the image data received from the external device;

synthesizing stored first image data and second image data, and synthesizing first image distinctive data from the first image data and second image distinctive data from the second image data; and applying a specific process amongst a plurality of predetermined processes to the synthesized image data of the first image data and the second image data, wherein the specific process applied to the synthesized image data is determined based on synthesized image distinctive data from synthesis of (i) the first image distinctive data and (ii) the second image distinctive data.

8. The image processing method as claimed in claim 7, further comprising the steps of:

selecting a synthesized image distinctive data generating rule from a plurality of the synthesized image distinctive data generating rules based on at least one of information in which presence of the first image distinctive data and the second image distinctive data is described; information in which input image quality modes of the first image data and the second image data are described; and information in which output image quality modes of the first image data and the second image data are described; and generating the synthesized image distinctive data of the first and second image distinctive data based on the selected synthesized image distinctive data generating rule.

9. The image processing method as claimed in claim 7, wherein:

the first image data and the second image data are read by the image processing apparatus.

10. The image processing method as claimed in claim 7, wherein:

the first image data are read by the image processing apparatus and the second image data are received from the external device.

11. The image processing method as claimed in claim 10, wherein:

the external device is a facsimile machine, a computer, another image processing apparatus, or an external recording medium.

12. A program product is a non-transitory computer readable medium embodying a program of instructions executable by a computer to perform an image processing method in an image processing apparatus, wherein:

the image processing method includes the steps of;

reading image data of a document;

generating image distinctive data of the read image data;

receiving image data input from an external device;

storing the read image data, the generated image distinctive data, and the image data received from the external device;

synthesizing stored first image data and second image data, and synthesizing first image distinctive data from the first image data and second image distinctive data from the second image data; and applying a specific process amongst a plurality of predetermined processes to the synthesized image data of the first image data and the second image data, wherein the specific process applied to the synthesized image data is determined based on synthesized image distinctive data from synthesis of (i) the first image distinctive data and (ii) the second image distinctive data.

13. A program product in a non-transitory computer readable medium for executing the image processing method as claimed in claim 12, wherein:

the image processing method further includes the steps of:
selecting a synthesized image distinctive data generating rule from a plurality of the synthesized image distinctive data generating rules based on at least one of information in which presence of the first image distinctive data and the second image distinctive data is described; information in which input image quality modes of the first image data and the second image data are described; and information in which output image quality modes of the first image data and the second image data are described; and
generating the synthesized image distinctive data of the first and second image distinctive data based on the selected synthesized image distinctive data generating rule.

14. A program product in a non-transitory computer readable medium for executing the image processing method as claimed in claim 12, wherein: the first image data and the second image data are read by the image processing apparatus.

15. A program product in a non-transitory computer readable medium for executing the image processing method as claimed in claim 12, wherein: the first image data are read by the image processing apparatus and the second image data are received from the external device.

16. A program product in a non-transitory computer readable medium for executing the image processing method as claimed in claim 15, wherein: the external device is a facsimile machine, a computer, another image processing apparatus, or an external recording medium.

17. The image processing apparatus as claimed in claim 1, wherein the plurality of predetermined processes include a filter process to convert characteristics of the synthesized image data and a color conversion process.

* * * * *